United States Patent
Matheson et al.

(10) Patent No.: US 9,575,950 B2
(45) Date of Patent: Feb. 21, 2017

(54) SYSTEMS AND METHODS FOR MANAGING SPREADSHEET MODELS

(71) Applicant: SmartOrg. Inc., Menlo Park, CA (US)

(72) Inventors: David E. Matheson, Palo Alto, CA (US); Somik Raha, Mountain View, CA (US)

(73) Assignee: SMARTORG, INC., Menlo Park, CA (US)

( * ) Notice: Subject to any disclaimer, the term of this patent is extended or adjusted under 35 U.S.C. 154(b) by 899 days.

(21) Appl. No.: 13/779,354

(22) Filed: Feb. 27, 2013

(65) Prior Publication Data

US 2014/0164895 A1    Jun. 12, 2014

Related U.S. Application Data

(60) Provisional application No. 61/735,749, filed on Dec. 11, 2012.

(51) Int. Cl.
 G06F 17/24 (2006.01)

(52) U.S. Cl.
 CPC .................. *G06F 17/246* (2013.01)

(58) Field of Classification Search
 CPC .................. G06F 8/38; G06F 3/1246
 See application file for complete search history.

(56) References Cited

U.S. PATENT DOCUMENTS

| | | | |
|---|---|---|---|
| 6,625,577 B1 | 9/2003 | Jameson | |
| 6,678,671 B1 | 1/2004 | Petrovic et al. | |
| 6,876,991 B1 | 4/2005 | Owen et al. | |
| 6,901,393 B1 | 5/2005 | Owen et al. | |
| 7,401,059 B1 | 7/2008 | Owen et al. | |
| 7,523,395 B1 | 4/2009 | Namait et al. | |
| 9,037,961 B1 * | 5/2015 | Mansell | G06F 17/246 |
| | | | 715/212 |
| 2002/0059183 A1 | 5/2002 | Chen | |
| 2002/0078086 A1 | 6/2002 | Alden et al. | |
| 2003/0065681 A1 * | 4/2003 | Houston | G06F 17/30575 |
| 2003/0101287 A1 * | 5/2003 | Novik | G06F 9/4428 |
| | | | 719/318 |
| 2005/0096950 A1 | 5/2005 | Caplan et al. | |
| 2006/0095833 A1 | 5/2006 | Orchard et al. | |
| 2007/0260575 A1 * | 11/2007 | Robinson | G06F 17/30348 |
| 2008/0244416 A1 | 10/2008 | Dumant et al. | |

(Continued)

OTHER PUBLICATIONS

Directed_acyclic_graph, May 25, 2012, pp. 1-5 http://en.wikipedia.org/wiki/Directed_acyclic_graph.*

(Continued)

*Primary Examiner* — Scott Baderman
*Assistant Examiner* — Mario M Velez-Lopez
(74) *Attorney, Agent, or Firm* — Shartsis Friese LLP; Cecily Anne O'Regan

(57) ABSTRACT

A method and computing device for managing models. The method and computing device receive a spreadsheet model, receive template management instructions on how to manage evaluations, create, from the spreadsheet model and the template management instructions, a model template, and deploy, in response to user action, an instance of the model template into a model relationship structure relating one or more spreadsheet model instances.

25 Claims, 18 Drawing Sheets

(56) References Cited

U.S. PATENT DOCUMENTS

| | | | |
|---|---|---|---|
| 2008/0256014 A1* | 10/2008 | Gould | G06F 8/10 706/48 |
| 2009/0055341 A1* | 2/2009 | Bidkar | G06Q 30/02 706/47 |
| 2009/0265683 A1 | 10/2009 | Salgar et al. | |

OTHER PUBLICATIONS

How to Use Templates in Exel 2010, Jan. 27, 2012, pp. 1-3 http://www.dummies.com/how-to/content/how-to-use-templates-in-excel-2010.html.*
Chron.com "How to Publish an Excel Spreadsheet", Apr. 24, 2012 http://smallbusiness.chron.com/publish-excel-spreadsheet-41996.html.*
Budget templates, Feb. 2, 2009, pp. 1-3 http://www.budgetsaresexy.com/2009/02/budget-is-back-baby-and-will-be-updated/.*
.NET Engine User's Guide—KDCalc.NET, Knowledge Dynamics, Inc., 2002-2003, pp. 1-14.
Parser Plugin User's Guide—KDCalc, Knowledge Dynamics, Inc., 2002-2003, pp. 1-11.
Spreadsheet Programming: The New Paradigm in Rapid Application Development, Knowledge Dynamics, Inc., 2002, hand annotated pp. 1-9.
Function Reference—KDCalc, Knowledge Dynamics, Inc., 2003, pp. 1-10.
McNamee, et al., Decision Analysis for the Professional: Decision Advisor Software Chapters 1-5, Third Edition, Smar!Org, Inc., Menlo Park CA, USA, 2001, pp. 1-30.
McNamee, Peter. Decision Analysis for the Professional: Decision Advisor Software Chapters 6-7 Coached, Third Edition, SmartOrg, Inc., Menlo Park CA. USA, 2001, pp. 1-57.
McNamee. Peter, Decision Analysis for the Professional: Decision Advisor Software Chapters. 6-7 Uncoached, Third Edition, SmartOrg, Inc., Menlo Park CA, USA, 2001, pp. 1-43.
Creswell, Don, Decision Advisor: A Knowledge-Based Decision System, SmartOrg, Inc., IOS Press, Menlo Park CA. USA, 2000, pp. 83-94.
Portfolio Navigator: A Web-Based Enterprise Decision System for Optimizing Project and Portfolio Value, SmartOrg, Inc., Menlo Park CA, USA, May 2, 2003, pp. 1-8.
The Manual: Decision Advisor, vol. I—Project Analysis, Strategic Decisions Group, Menlo Park CA, USA, 1998, pp. 1-424.
The Manual: Decision Advisor, vol. II—Portfolio Analysis, Strategic Decisions Group, Menlo Park CA. USA, 1998, pp. 425-656.
The Manual: Decision Advisor, vol. III—Command Reference, Strategic Decisions Group, Menlo Park CA, USA, 1998, pp. 657-1000.
Strategic Decisions Group, "Strategic Management of R&D—Overview," Prepared for SEP Dutch Utility Generating Board, Utility Working Group, N.V. KEMA Risk Analysists, May 22, 1995, 21 pages.
Fisher et al., "Visualizations everywhere: A Multiplafform Infrastructure for Linked Visualization", IEEE Transactions on Visualization and Computer Graphics, IEEE Service Center, Los Alamitos, CA, US, vol. 16, No. 6, Nov. 2010 (Nov. 2010), pp. 1157-1163, XP011349038, ISSN: 1077-2626, DOI: 10.1109/TVCG.2010.222.
Ludtke et al., "A F\ramework to Model Metadata for Knowledge Management Tools", 4th International Conference on Knowledge Management for Space Missions, Jun. 25, 2012 (Jun. 25, 2012), XP055279241, Toulouse, France; retrieved from the Internet: URL:http://citeseerx.ist.psu.edu/viewdoc/download?doi=10.1.1.458.7013&rep=rep1&type=pdf.
Mehmet et al., "Damia—A Data Mashup Fabric for Intranet Applications", Proceedings of VLDB 07, Sep. 7, 2007 (Sep. 7, 2007), pp. 1370-1373, XP055279232, Vienna, Austria; retrieved from the Internet: URL:http://www.vldb.org/conf/2007/papers/demo/p1370-altinel.pdf.

* cited by examiner

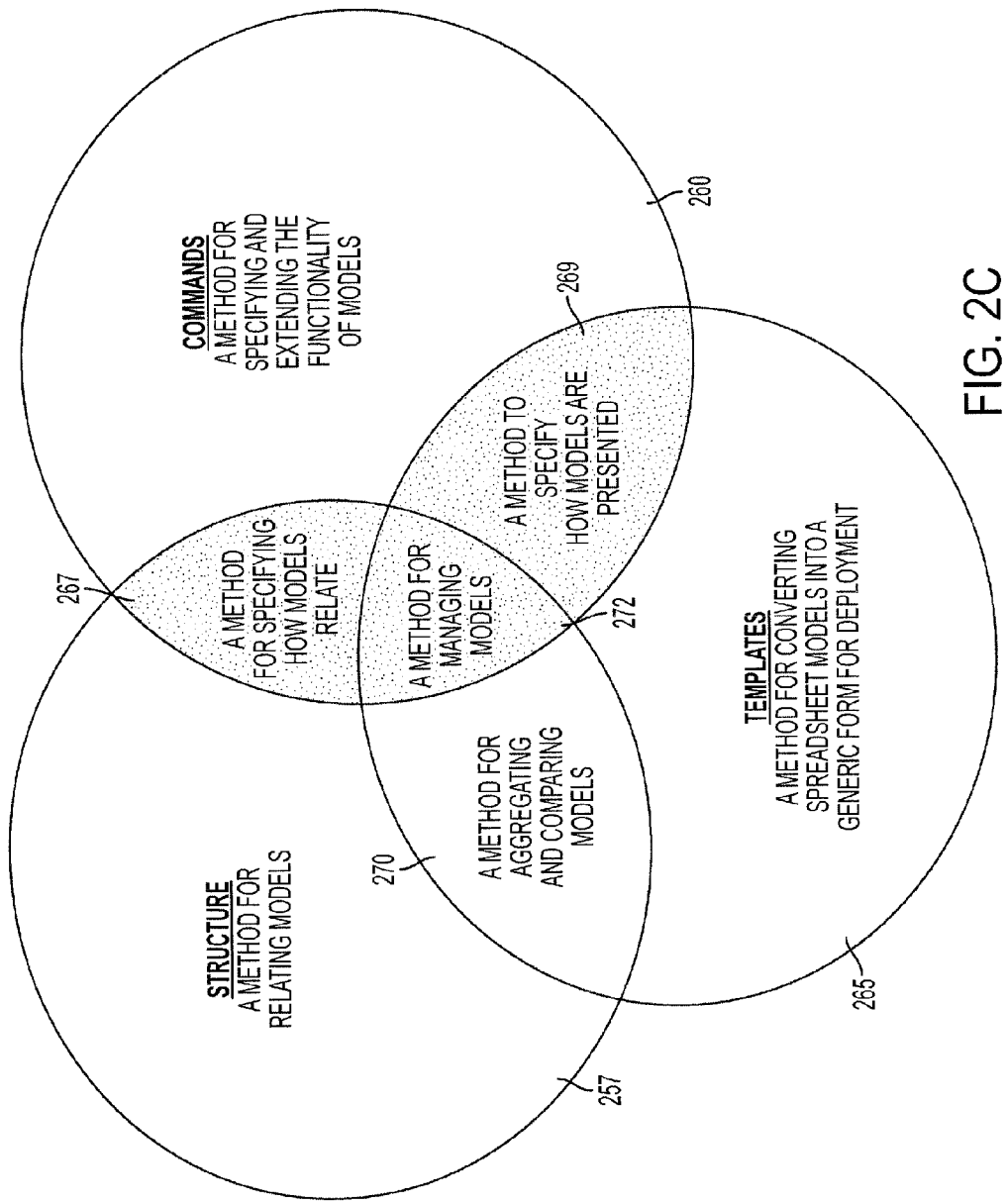

|  | Net Sales | Margin | Operating Profit |
|---|---|---|---|
| Latin America | 5 | 0.10 | 0.5 |
| Aus and NZ | 3 | 0.15 | 0.45 |
| ASIA | 4 | 0.20 | 0.8 |
| EMEA | 10 | 0.30 | 3 |
| North America | 15 | 0.25 | 3.75 |
| Total | 37 |  | 8.5 |

FIG. 10

|  | Net Sales | Margin | Operating Profit |
|---|---|---|---|
| Latin America | 5 | 0.10 | 0.5 |
| AUS and NZ | 3 | 0.15 | 0.45 |
| Asia | 4 | 0.20 | 0.8 |
| EMEA | 10 | 0.30 | 3 |
| North America | 15 | 0.25 | 3.75 |
| TOTAL | 37 |  | 8.5 |

FIG. 11

Applications

| Technologies | | 1 | 2 | 3 | 4 |
|---|---|---|---|---|---|
| | A | A1 | A2 | A3 | ... |
| | B | B1 | B2 | B3 | ... |
| | C | ... | | | |
| | D | ... | | | |

FIG. 12

| | | | | | | |
|---|---|---|---|---|---|---|
| Annual Revenue | *Annual revenue* | *Millions of dollars* | 10 | 20 | 30 | Assessed by Joe Doe<br>Reasons for pessimism 1., 2, 3.<br>Reasons for Optimism ... |
| Annual Costs | *Annual Costs* | *Millions of dollars* | 2 | 3 | 4 | Assessed by Jane Doe<br>Reasons for Pessimism 1. 2. 3.<br>Reasons for Optimism ... |
| Number of Years | *Market Play Duration* | *Years* | 1 | 2 | 3 | Assessed by Marty Doe<br>Reasons for Pessimism 1. 2. 3.<br>Reasons for Optimism ... |

FIG. 13

|  | Net Sales | Margin | Operating Profit |
|---|---|---|---|
| Latin America | 60 | 0.22 | 13.2 |
| Aus and NZ | 30 | 0.32 | 9.6 |
| ASIA | 40 | 0.27 | 10.8 |
| EMEA | 100 | 0.20 | 20 |
| North America | 270 | 0.22 | 59.4 |
| Total | 500 |  | 113 |

FIG. 14

SYSTEMS AND METHODS FOR MANAGING SPREADSHEET MODELS

CROSS-REFERENCE

This application claims the benefit of U.S. Provisional Application No. 61/735,749, filed Dec. 11, 2012, entitled Methods and Systems for Managing Spreadsheet Models by Matheson and Raha, which application is incorporated herein by reference.

BACKGROUND OF THE INVENTION

People in organizations often conduct evaluations and analysis using models in one of two basic ways. The first method is to create spreadsheet models (usually in Microsoft® Excel®), store them in file structures (on the computer or server or web), and transmit them back and forth (typically via email or using shared spreadsheets like Google® Docs) with collaborators. This method does not scale, as it quickly becomes complicated and creates significant communication and maintenance costs for models. Version control, comparing analyses, aggregating results across models and tracking the sources of information are difficult. The second method is to create a database, defining fields in a tabular format and conducting evaluations through database queries. This method provides for better web access, comparison and aggregation, but greatly restricts the flexibility and power of the modeling. For example, a programmer typically has to be employed to change the database fields or structure.

SUMMARY OF THE INVENTION

This disclosure obtains the best of both worlds by using spreadsheets as a holder of logic and keeping data outside of the spreadsheet in a database. This disclosure relates to a method and system for managing models in a way that has much of the flexibility of spreadsheet models with the scalability of databases.

One aspect of the disclosure is the use of a Model Template created from a spreadsheet model and used to deploy (e.g., in response to user action) one or more instances of that model, usually over the web. The Model Template (hereafter referred to as "template") separates the model inputs and outputs, provides for storing data (e.g., in a database), and specifies how the model is experienced when deployed. These templates can also be used in relation to each other (see below) to take inputs from or provide outputs for other instances of the same or different templates. The template specifies the calculation structure (from the spreadsheet) and how an instance of the model is deployed (see "commands" below).

One aspect of the invention is the use of a Model Relationship Structure (hereafter referred to as "structure") to relate instances of templates to each other in a logical or convenient relationship. Typical structures are a directed acyclic graph (DAG), tree (or hierarchy), or a matrix. These relationships include the ability to organize the model template instances, aggregate or compare their outputs, to accept inputs from other template instances (hereafter referred to as "instances") or provide outputs to them. Users can easily manage instances on the structure, add new instances (by selecting appropriate templates), delete them, etc. Additionally, the structure may be used to specify access control, with some users having the ability to read or write some instances on the structure and other users not having this ability.

One aspect of the disclosure is the use of a command library to let a template specify how it will be deployed in an instance. Commands (also referred to herein as template management instructions) in the command library help specify how to manage evaluations on a spreadsheet. Commands are typically of two types—Spreadsheet Commands and Structure Commands. The former operate directly on the spreadsheet while the latter operates on the Model Relationship Structure. Spreadsheet Commands comprise of Spreadsheet Specification and Spreadsheet Action Commands. Spreadsheet Specification Commands specify inputs and outputs on the spreadsheet model that are available to all other Spreadsheet Commands. Spreadsheet Action Commands are comprised of Presentation and Enhancement Commands. Presentation Commands specify how inputs specified in the I/O commands are to be gathered from the user, and how output ranges from the spreadsheet are to be shown to the user. Enhancement Commands specify operations on the spreadsheet that go beyond the spreadsheet and add more capability. An example of an Enhancement Command would be a Tornado Command, which operates on a designated output of the spreadsheet and supplies inputs and fetches outputs multiple times from it based on a special algorithm to produce the data needed for plotting a Tornado Diagram. Another example would be a Monte Carlo Command, which can be set up with distributions and number of iterations, and which generates random numbers into a designated cell of a spreadsheet and collects outputs from another designated cell, allowing for further statistical operations at the end of the Monte Carlo simulation. Structure Commands are comprised of Structure Specification Commands and Structure Action Commands. Structure Specification Commands specify which outputs are available from child nodes to parent nodes. Structure Action Commands specify the actions that a parent node must perform and the outputs from child nodes on which they will be performed. For instance, a Structure Specification Command may designate the result of a spreadsheet calculation as an output that is available to parent nodes. A parent node may then specify a Structure Action Command such as "Compare Value," which allows for the comparison of the designated output across child nodes.

In one aspect of the disclosure, a method and a computing module executing on a computing device include receiving a spreadsheet model, receiving template management instructions on how to manage evaluations, creating, from the spreadsheet model and the instructions, a model template, and deploying (e.g., in response to user action) an instance of the model template into a Model Relationship Structure relating one or more spreadsheet model instances. In one embodiment, the receiving of instructions on how to manage evaluations includes receiving instructions on how to create, coordinate, synchronize, compare, and/or aggregate evaluations. The receiving of instructions on how to manage evaluations may include receiving instructions on how evaluations using the template interrelate with evaluations from the one or more spreadsheet model instances.

The deploying of an instance of the model template may further include utilizing a DAG, a tree, or a matrix to represent a relationship between model instances. The receiving of the instructions on how to manage evaluations can include creating instructions that relate the one or more spreadsheet models to each other across the structure (e.g., DAG). The receiving of the instructions on how to manage evaluations can further include one or more of comparing evaluations, aggregating evaluations, synchronizing evaluations, enhancing the model template, and determining relationships along the model relationship structure.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 2C is a Venn diagram of a relationship between a structure, commands, and templates in accordance with the present disclosure;

FIG. 10 is a table illustrating net sales and operating profits in billions of dollars;

FIG. 11 is a table illustrating a spreadsheet with inputs and outputs;

FIG. 12 is a table illustrating a matrix showing a model relating application to technology;

FIG. 13 is a table showing spreadsheet action command; and

FIG. 14 is another table illustrating net sales and operating profits in billions of dollars.

DETAILED DESCRIPTION OF THE INVENTION

Various embodiments and configurations are disclosed herein; however, it is to be understood that the disclosed embodiments and configurations are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present disclosure is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, application specific integrated circuit (ASIC), or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Figure 1:
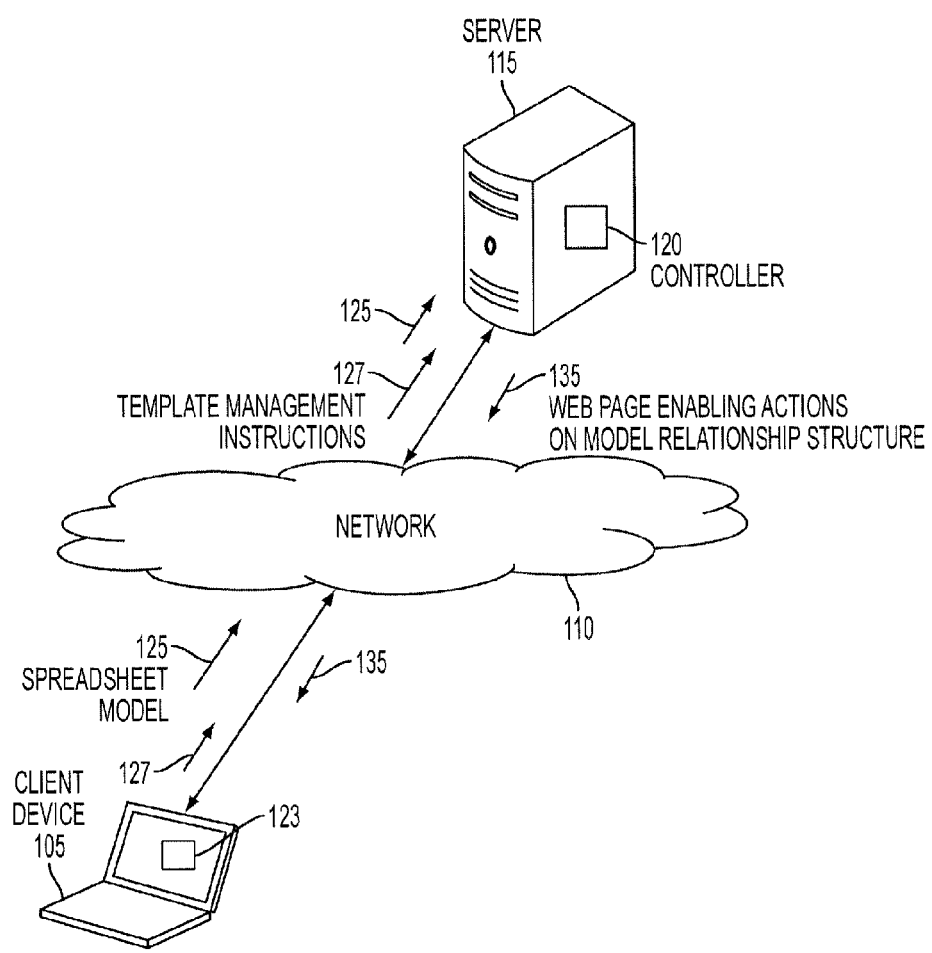
FIG. 1 is a block diagram of a client device communicating over a network with a server computer in accordance with the present disclosure.

FIG. 1 is a schematic diagram illustrating an example of a network and devices implementing the present disclosure. As will be appreciated by those skilled in the art, networks and devices implementing the disclosure may vary, for example, in terms of arrangement or in terms of type of components. Such alternative configurations are within the scope of the disclosure. FIG. 1 includes, for example, a client device 105 in communication over a network 110. The network 110 may be a local area network (LAN)/wide area network (WAN), such as the Internet, so that the client device 105 can communicate with a server 115 (also referred to below as server computer 115). Network 110 may be any type of network, such as a wireless network or a wired network.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows® Server, Mac® OS X®, Unix®, Linux®, FreeBSD®, or the like.

Server 115 may include a device that includes a configuration to provide content via a network to another device. A server 115 may, for example, host a web site, such as a business site, educational site, dictionary site, encyclopedia site, wiki, financial site, government site, etc. Server 115 may further provide a variety of services that include, but are not limited to, web services, third-party services, audio services, video services, email services, instant messaging (IM) services, short messaging system (SMS) services, multi-media messaging system (MMS) services, file transfer protocol (FTP) services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

A network is configurable such that it may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. Additionally, a network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

As an example, suppose that you are trying to calculate taxes for a corporation, and this corporation has a complex structure of holding companies and partial ownership. You would load an instance of the tax model for every legal entity. The companies have to fill out the instance for themselves, but, in addition, these instances are in a relationship to each other, determined by the structure, which in this analogy is the legal relationship among the companies. To figure out the taxes for the holding company, you have to add up the taxes for the subsidiaries, at the structural relationship, and apply the tax rules to the holding company. Thus, these instances or models are in relationship to each other through some kind of structure.

In one embodiment, the server computer 115 includes a controller 120. The controller 120 is a software module (or hardware module) that processes spreadsheets, as described in more detail below. The controller 120 can be located within the server 115 or can be external to and in communication with the server 115. In one embodiment, the user using the client device 105 creates and uploads a spreadsheet model 125 to the server 115.

Figure 2A:
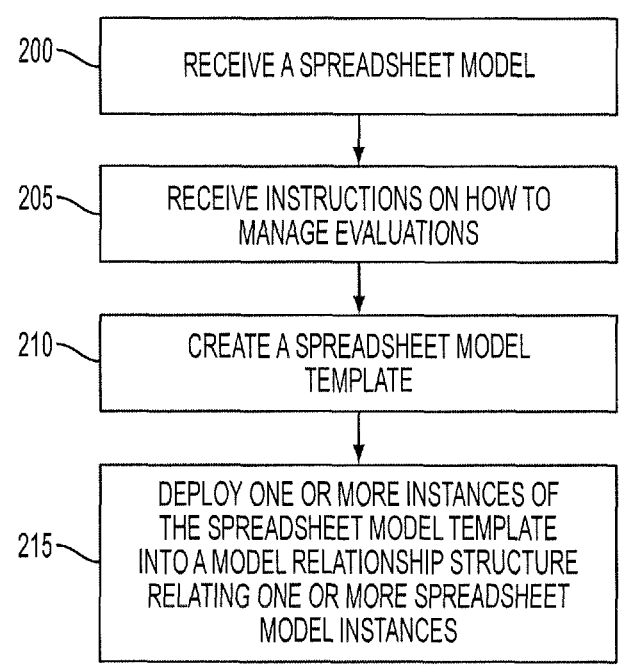
FIG. 2A is a flowchart illustrating steps performed by the server computer in accordance with the present disclosure.

Also referring to FIG. 2A, the spreadsheet model can be a spreadsheet stored on the client device 105 (e.g., an Excel® file) or may be accessible to the user (e.g., a Google® Spreadsheet®). The server 115 receives the spreadsheet model 125 (Step 200) and transmits the spreadsheet model 125 to the controller 120 (which may include a software wizard for converting the spreadsheet model into a template). In one embodiment, the controller 120 (e.g., wizard) receives template management instructions 127 on how to manage evaluations (Step 205) and creates, from the spreadsheet model 125 and from the instructions, a spreadsheet Model Template (Step 210). The spreadsheet Model Template is a spreadsheet model with instructions or commands that operate on the data in the spreadsheet model. The instructions 127 on how to manage evaluations can include instructions on how to create, coordinate, synchronize, compare, and/or aggregate evaluations. These instructions 127 can also include instructions on how evaluations using the template interrelate with evaluations from the one or more spreadsheet models. An evaluation is the determination of the outputs of the spreadsheet based on the inputs and the commands or instructions associated with the inputs (and/or outputs). In one embodiment, the wizard then places the model template into the template database which makes the template available for deployment.

The controller 120 can then deploy one or more instances of the spreadsheet model template into a Model Relationship Structure relating one or more spreadsheet model instances (Step 215). In one embodiment, the controller 120 deploys one or more instances of the spreadsheet model template into a Model Relationship Structure relating one or more spreadsheet model instances in response to an initiation of or action by the user from client device 105. In one embodiment, the controller 120 deploys an instance or instances of the model template on a web page 135 so that the user of the client device 105 can perform actions on (e.g., modify) the instance via a web browser. In one embodiment, other users can use the web page 135 to create or access spreadsheet models from one or more of the instances of the template.

Each of these instances allows the user to supply data from a computing device (or automatically fetch data from user-specified sources). In one embodiment, this input data is stored in an instance database and managed by the database server. This data can be supplied to the controller 120, which then passes it to the calculation server (as described in more detail below). The calculation server uses the data supplied in conjunction with the Spreadsheet Specification and Action commands to evaluate and prepare results from the spreadsheet model. In addition, the Calculation Server also processes the Structure Specification Commands to designate chosen outputs as available to parents. Together, these results are sent back to the controller 120, which then saves it in the database. When the user goes to the parent of a leaf instance, the controller 120 processes the Structure Action Commands which specify the action and the designated outputs of child nodes on which the action will apply. These actions are typically about comparing outputs.

Figure 2B:
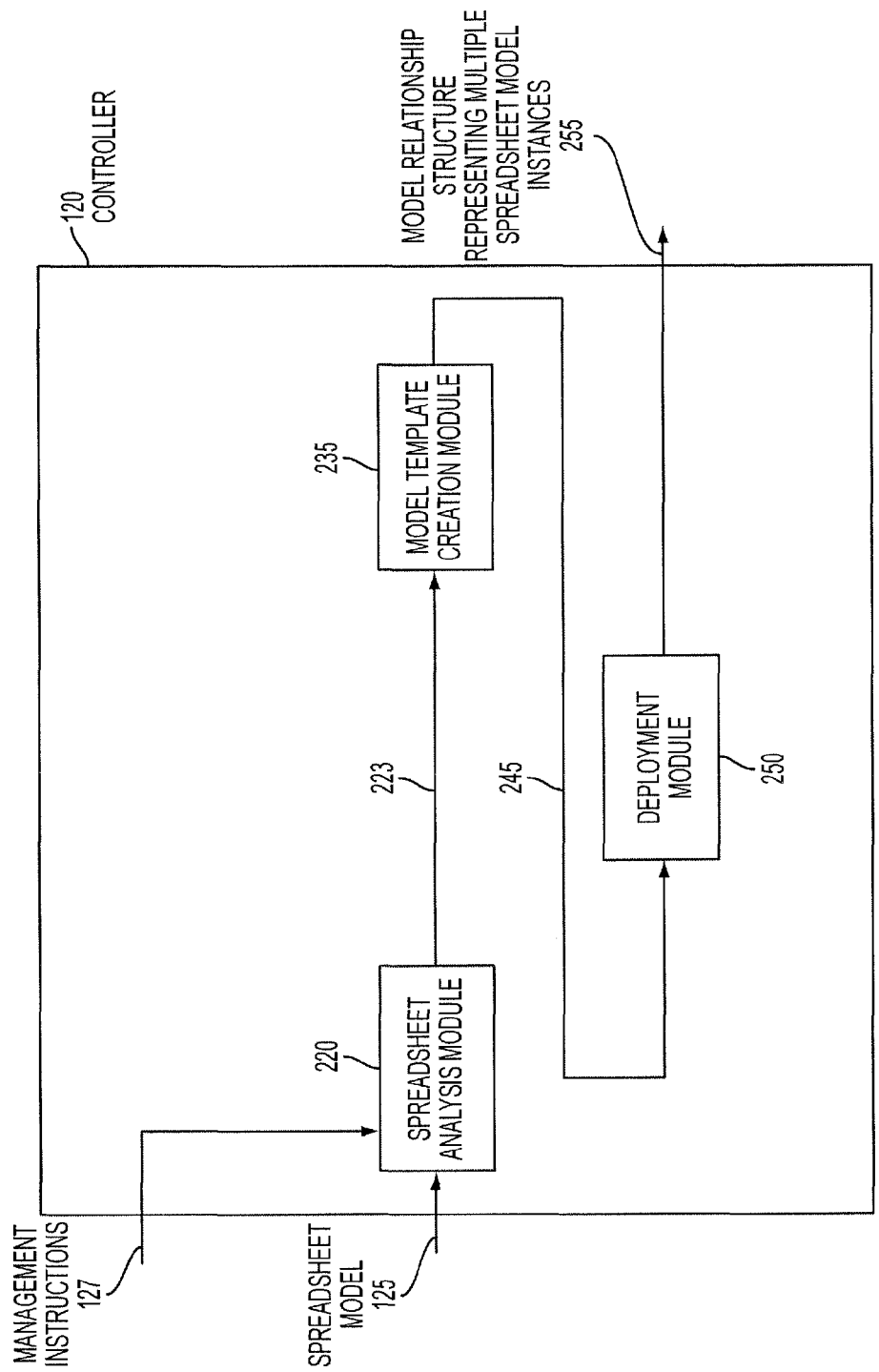
FIG. 2B is a block diagram of a controller of the server computer in accordance with the present disclosure.

FIG. 2B shows a block diagram of an embodiment of the controller 120. As described above, the controller 120 receives spreadsheet model 125 (e.g., from the client device 105). The spreadsheet model 125 is provided as input into a spreadsheet analysis module 220. The spreadsheet analysis module 220 also receives template management instructions 127. The spreadsheet analysis module 220 transmits the model and instructions 233 to a model template creation module 235 which transforms the spreadsheet model 125 into a model template based on the management instructions 127. As stated above, these management instructions 127 can be instructions on how to create, coordinate, synchronize, compare, and/or aggregate evaluations associated with the spreadsheet model.

The model template and management instructions 245 are then transmitted into a deployment module 250 (which may be a template database, as shown below in FIG. 3A). The user can then use a GUI to deploy one or more instances of the model template into a model relationship structure relating one or more spreadsheet model instances. In one embodiment, the user of the client device 105 can access and perform actions on the deployed instance via a web browser on the client device 105.

As an example, suppose you are trying to forecast the growth of a corporation over the next five years. You can make a spreadsheet model like the one shown in FIG. 10. Net Sales and Operating Profit are in billions of dollars in this example. This spreadsheet model can then be used to specify the inputs and outputs.

In the example shown in FIG. 11, there will be ten inputs and two outputs as shown. Where the five entries under Net Sales and five entries under Margin provide a total of 10 input variables resulting in two output variables of 37 and 8.5. The template will allow users to enter 10 inputs and compare the two output variables for multiple instances of this model, e.g. a momentum model signifying business as usual can be compared to an acquisition model where the company acquires multiple businesses in a particular geography. Both models will use the same model template. The template will also allow extraction of full calculation sheets showing all the inputs and outputs like the figure above.

The template model can also specify that the inputs specified above are not single numbers, but ranges. Moreover, additional evaluation instructions can be added to do uncertainty analysis, for instance, a tornado chart that shows the impact of the ranges of inputs on the outputs.

FIG. 2C is a Venn diagram of an example of a relationship between a structure 257, commands 260, and templates 265. The structure 257 can be a method for relating models. The commands 260 can be a method for specifying and extending the functionality of models. The templates 265 can be a method for converting spreadsheet models into a generic form for deployment. An intersection 267 of commands and structure can be a method for specifying how models relate. An intersection 269 of commands and templates can be a method to specify how models are presented. An intersection 270 of structure and templates can be a method for aggregating and comparing models. An intersection 272 of structure, commands, and templates can be a method for managing models.

Figure 3A:
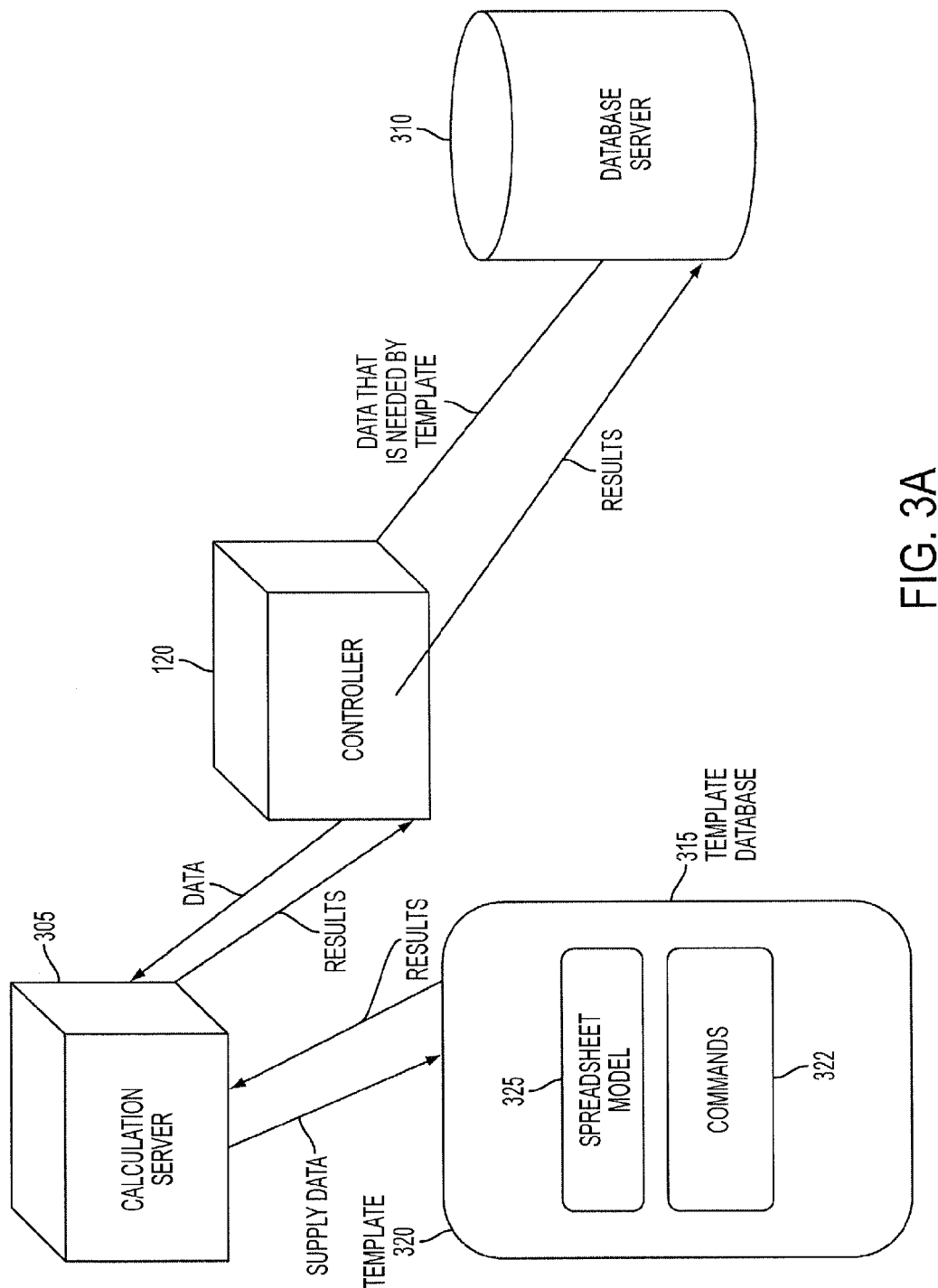
FIG. 3A is a system diagram of the server computer in accordance with the present disclosure.

FIG. 3A is an embodiment of a more detailed system diagram of server 115. The server 115 may include multiple servers residing on a single computing device or in communication with each other and residing on different computing devices. As stated above, server 115 includes a controller 120. The controller 120 is in communication with a calculation server 305 and a database server 310. The calculation server 305 accesses and operates on a database of templates to which it has access. Template database 315 has a collection of model templates. A model template 320 is created by combining a spreadsheet model 325 (e.g. an Excel spreadsheet) with input/output specifications, evaluation instructions and comparison/aggregation instructions (referred to herein as commands 322 or template management instructions 127). When the controller 120 wants to access the templates, the controller 120 communicates with the calculation server 305. The calculation server 305 is stateless—it receives inputs from the controller 120, passes the input into the appropriate model template (fetched from the template database 315), computes outputs using evaluation instructions and returns them to the controller 120. The calculation server 305 executes commands 322 on the spreadsheet model 325. These commands 322 reside in the "application structure". The controller 120 receives the outputs from the calculation server 305 and is responsible for rendering and showing these outputs on the displayed web page 135. In addition, the controller 120 is also responsible for controlling the presentation of the model, including obtaining inputs from the user. When the outputs are received from the calculation server 305, the controller 120 stores them in the database server 310. The controller 120 also handles commands that deal with the model relationship structure in terms of aggregation and comparison.

Figure 7A:
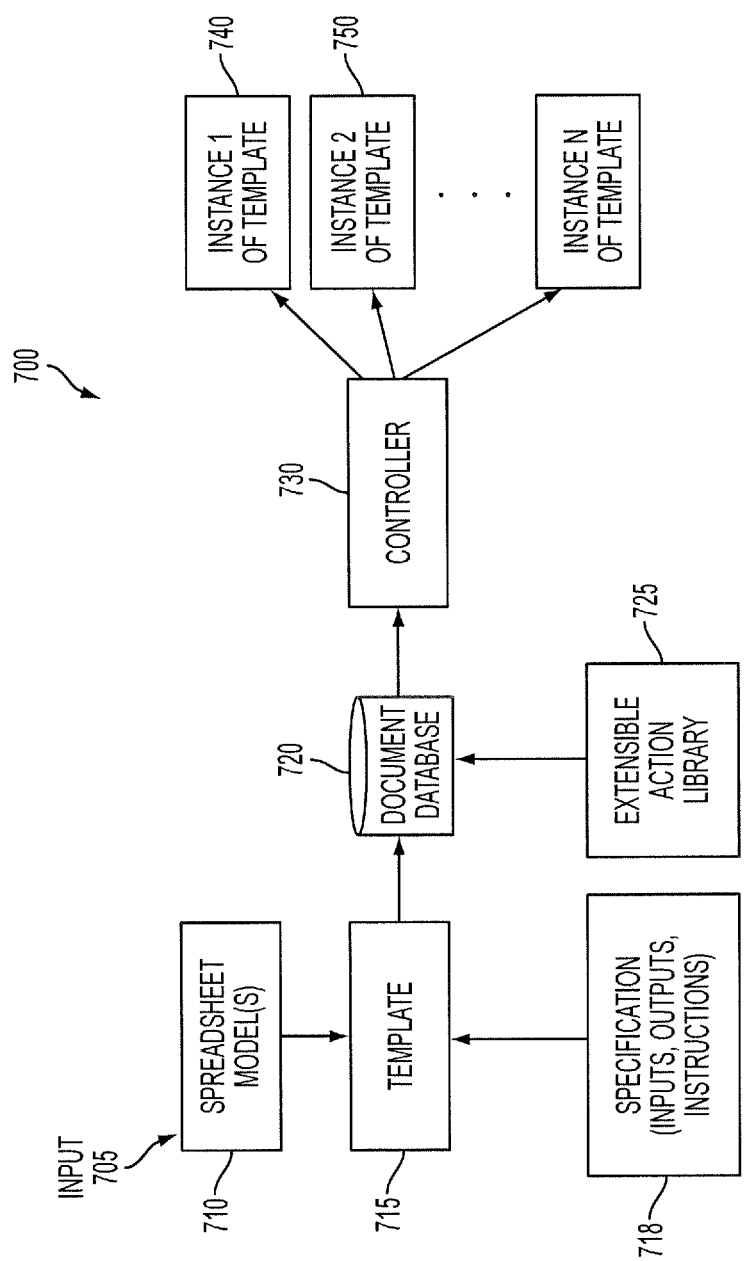
FIG. 7A is a block diagram of a system in accordance with the present disclosure.
Figure 7B:
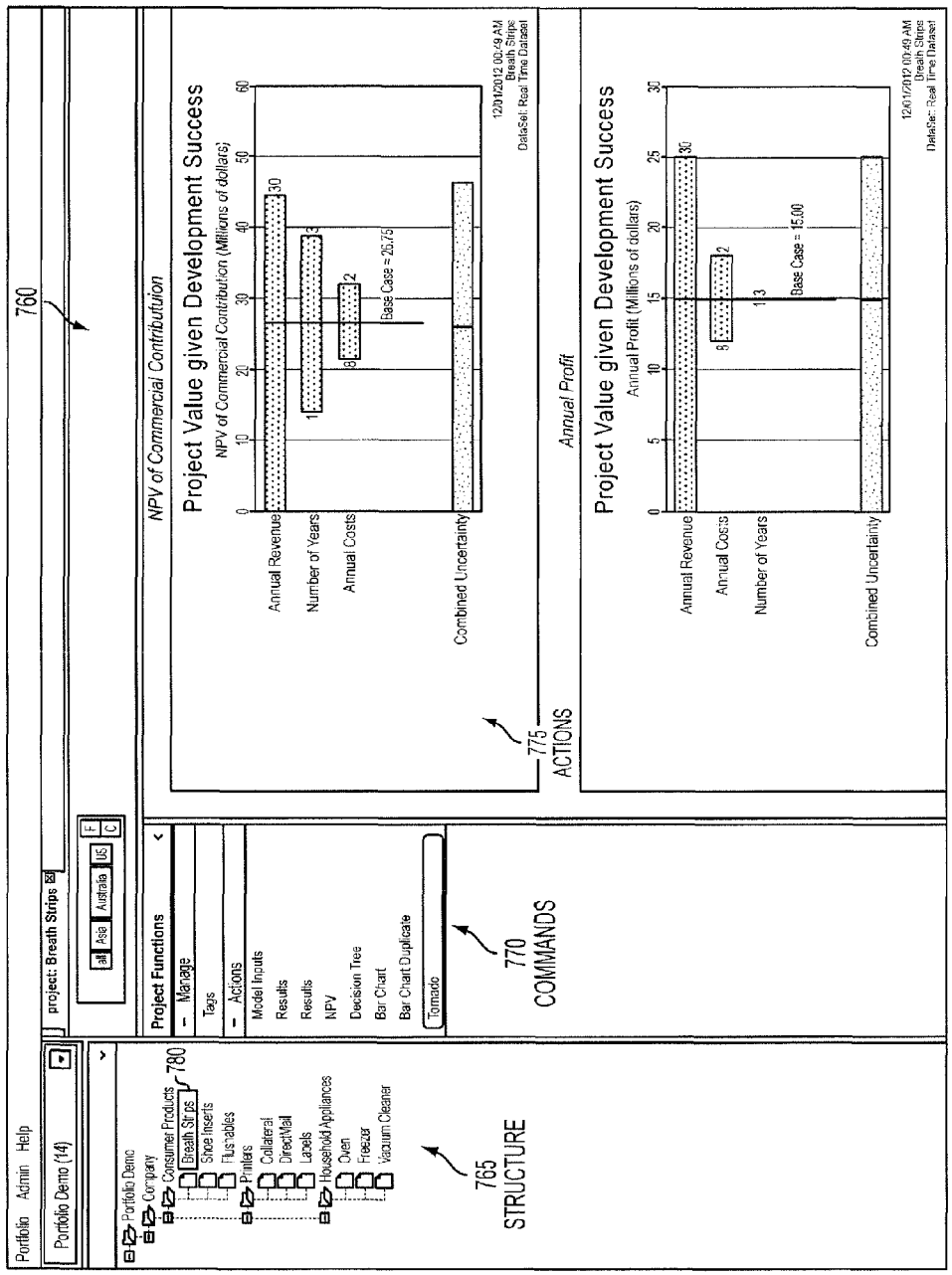
FIG. 7B is a screen shot of an embodiment of a web page displayed by the client device from the server computer in accordance with the present disclosure.
Figure 7C:
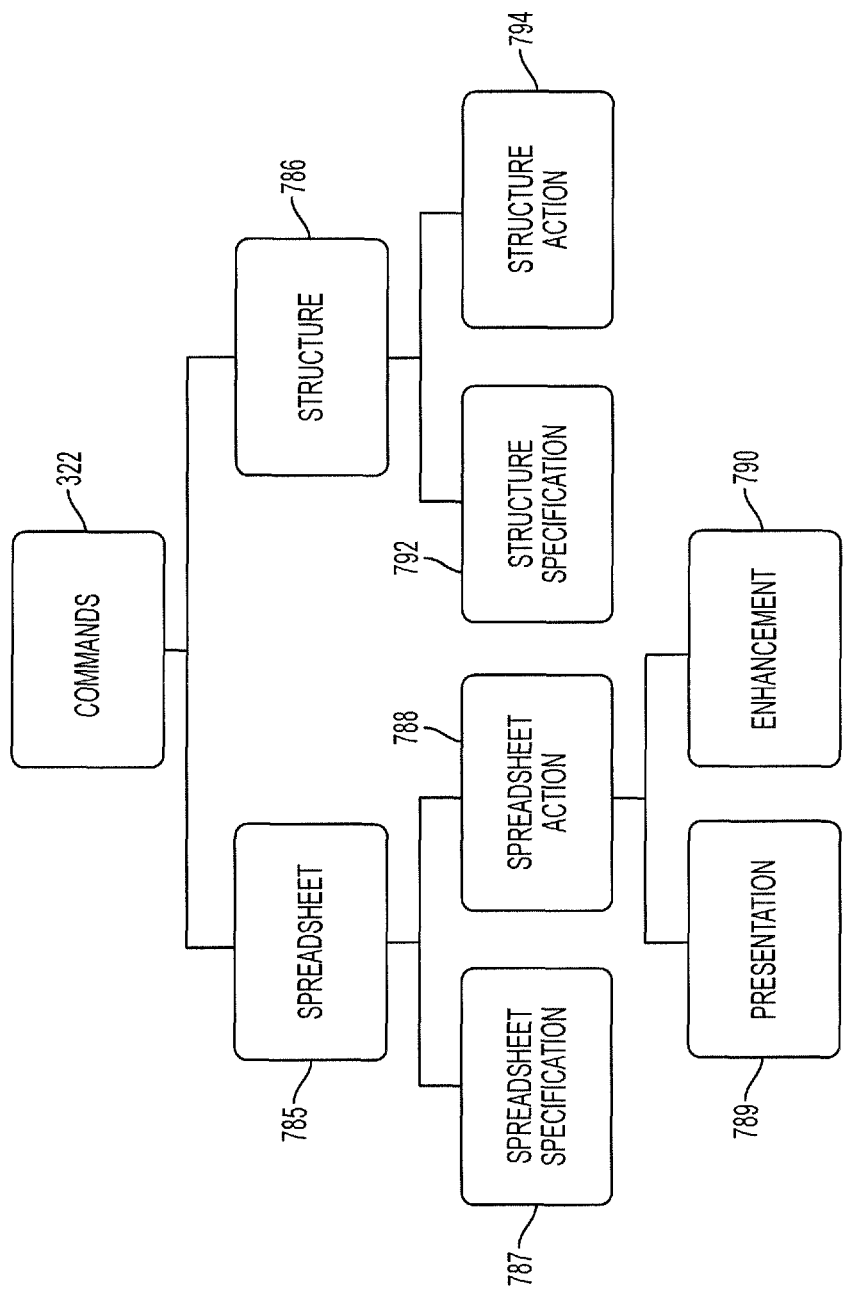
FIG. 7C is a block diagram of command types in accordance with the present disclosure.

As stated above and as shown in FIG. 7C, commands 322 (template management instructions 127) are typically of two types—Spreadsheet Commands 785 and Structure Commands 786. The former operate directly on the spreadsheet while the latter operates on the Model Relationship Structure. Spreadsheet Commands 785 include Spreadsheet Specification 787 and Spreadsheet Action Commands 788. Spreadsheet Specification Commands 787 specify inputs and outputs on the spreadsheet model that are available to other Spreadsheet Commands 785. Spreadsheet Action Commands 788 are comprised of Presentation 789 and Enhancement Commands 790. Presentation Commands 789 specify how inputs specified in the I/O commands are to be gathered from the user, and how output ranges from the spreadsheet are to be shown to the user. Enhancement Commands 790 specify operations on the spreadsheet that go beyond the spreadsheet and add more capability. An example of an Enhancement Command would be a Tornado Command, which operates on a designated output of the spreadsheet and supplies inputs and fetches outputs multiple times from it based on a special algorithm to produce the data needed for plotting a Tornado Diagram. Another example would be a Monte Carlo Command, which can be set up with distributions and number of iterations, and which generates random numbers into a designated cell of a spreadsheet and collects outputs from another designated cell, allowing for further statistical operations at the end of the Monte Carlo simulation. Structure Commands 786 are comprised of Structure Specification Commands 792 and Structure Action Commands 794. Structure Specification Commands 792 specify which outputs are available from child nodes to parent nodes. Structure Action Commands 794 specify the actions that a parent node must perform and the outputs from child nodes on which they will be performed. For instance, a Structure Specification Command may designate the result of a spreadsheet calculation as an output that is available to parent nodes. A parent node may then specify a Structure Action Command such as "Compare Value," which allows for the comparison of the designated output across child nodes. The Structure Action Commands reside in a "portfolio structure."

In one embodiment, the controller 120 coordinates multiple spreadsheet models by utilizing a directed acyclic graph (DAG). Briefly, a DAG is a graph formed by a collection of vertices and directed edges, each edge connecting one vertex to another, such that there is no way to start at some vertex v and follow a sequence of edges that eventually loops back to v again. Generally, DAGs may be used to model several different kinds of structure. A collection of tasks that have to be ordered into a sequence, subject to constraints that certain tasks must be performed earlier than others, may be represented as a DAG with a vertex for each task and an edge for each constraint. Algorithms for topological ordering may be used to generate a valid sequence. DAGs may also be used to model processes in which information flows in a consistent direction through a network of processors.

Figure 3B:
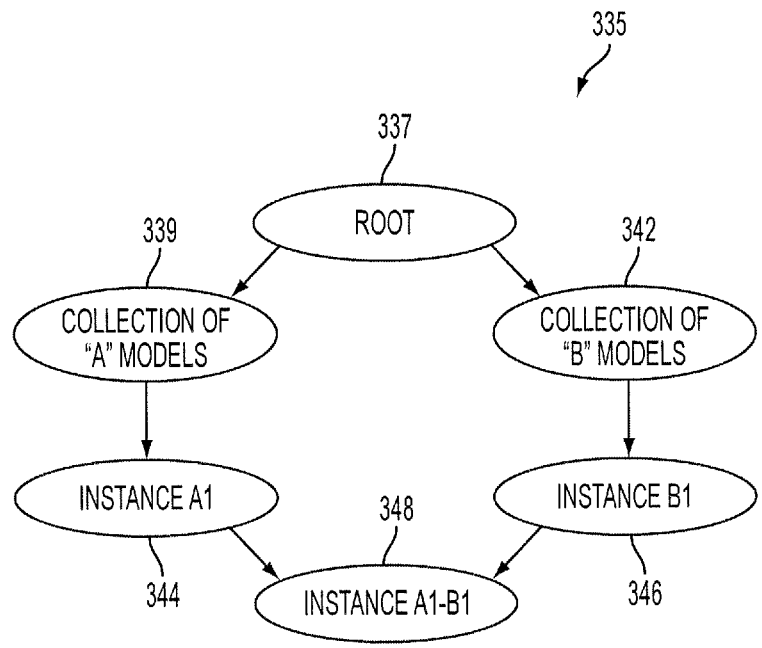
FIG. 3B is a flow diagram illustrating a Model Relationship Structure embodied by a directed acyclic graph (DAG) representation of spreadsheet models in accordance with the present disclosure.

For example, FIG. 3B illustrates an embodiment of a DAG representation 335 of models. A root vertex 337 connects to a collection of "A" models 339 and a collection of "B" models 342. The collection of "A" models 339 is connected to an instance A1 344. The collection of "B" models 342 is connected to an instance B1 346. Both instances 344, 346 are connected to an instance A1-B1 348.

Figure 3C:
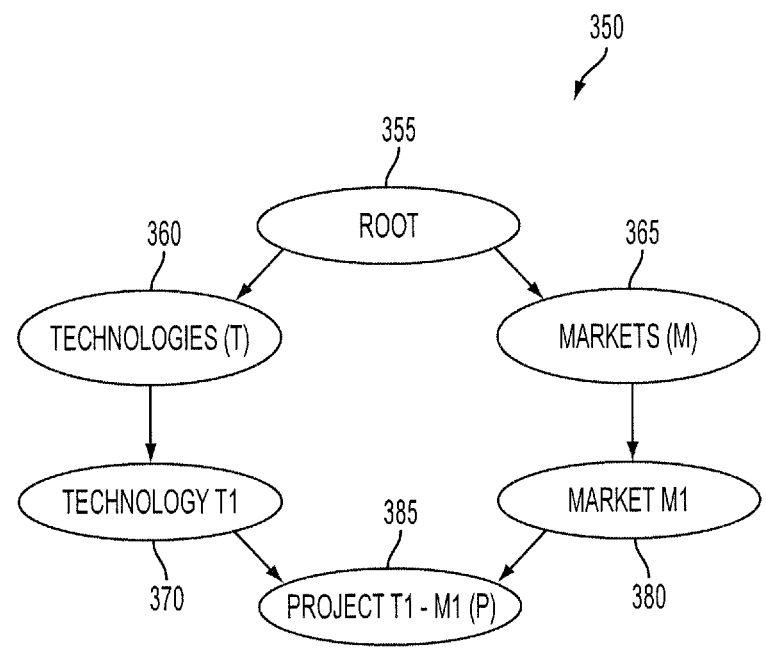
FIG. 3C is a flow diagram illustrating a Model Relationship Structure embodied by a directed acyclic graph (DAG) representation of an example of spreadsheet models in accordance with the present disclosure.

FIG. 3C shows a concrete example of a DAG representation 350 of models. Root vertex 355 is connected to a Technologies vertex 360. The Technologies vertex 360 is a collection of instances of the model "T". Specific technologies like Technology T1 370 are an instance of this model. Similarly, Root 355 is also connected to a Markets vertex 365. Markets vertex 365 is a collection of instances of the model "M". Specific markets like Market M1 380 are an instance of this model. A project is an instance of a model "P" that has access to information from both T1 and M1. Project T1-M1 (P) 385 represents this project.

Figure 4A:
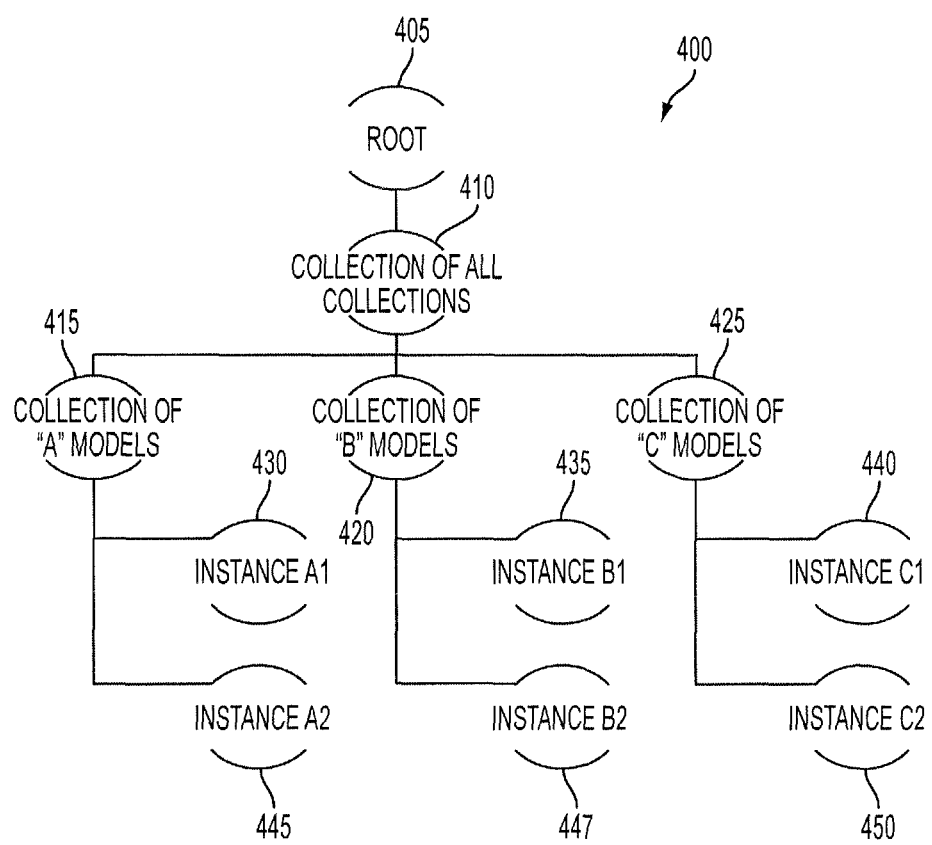
FIG. 4A is a Model Relationship Structure embodied by a tree representation of spreadsheet models in accordance with the present disclosure.

The controller 120 can also coordinate multiple spreadsheet models by utilizing other structures, such as a tree or a matrix. For example, FIG. 4A shows an embodiment of a tree representation 400 of spreadsheet models. A root vertex 405 is connected to a collection of all collections vertex 410. This collection vertex 410 is separated into a collection of "A" models 415, a collection of "B" models 420, and a collection of "C" models 425. The collection of "A" models 415 is deployed into instances, such as Instance A1 430 and Instance A2 445. The collection of "B" models 420 is deployed into instances, such as Instance B1 435 and Instance B2 447. The collection of "C" models 425 is deployed into instances, such as Instance C1 440 and Instance C2 450.

Figure 4B:
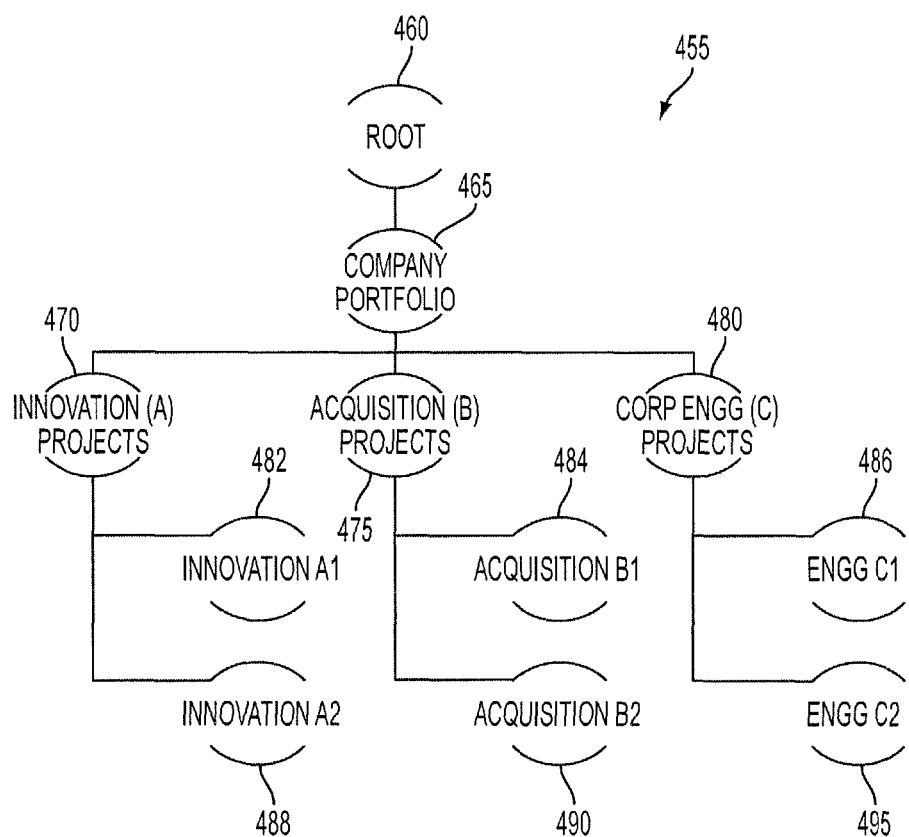
FIG. 4B is a Model Relationship Structure embodied by a tree representation of an example of spreadsheet models in accordance with the present disclosure.

FIG. 4B shows a concrete example of a tree representation 455 of spreadsheet models. A root vertex 460 is connected to a company portfolio 465. In an example, the company portfolio 465 is constructed with collections of projects, such as Innovation (A) Projects 470, Acquisition (B) Projects 475, and Corporate Engineering (C) Projects 480. Innovation projects can have a particular model of evaluation, while acquisition projects can have another model of evaluation. Corporate Engineering projects may have a mixture of both kinds of projects. Innovation A1 482 and Innovation A2 488 are instances of the Innovation model (A) 470. Acquisition B1 484 and Acquisition B2 490 are instances of the Acquisition model (B) 475. The Corporate Engineering projects 480 has instances for Engineering Project C1 486 and Engineering Project C2 495. An example of a matrix structure is shown in FIG. 12, where each cell (e.g., A1, B1) contains the model relating each application to each technology.

The model relationship structure 255 enables the specifying of inputs to be sent into and outputs to be extracted from the spreadsheet model 125. The model relationship structure 255 specifies each input and output, and may provide more description around the input or the output (e.g., using attributes in a JavaScript Object Notation (JSON) structure or an Extensible Markup Language (XML) structure). For instance, an input connected to a spreadsheet cell C1 can have an English prompt, like "Market Size", a unit like "millions of dollars", a description like "Projected for the next five years", a constraint like "Number" which states that numbers are to be allowed for this input, a type like "DISTRIBUTION" or "SCALAR" which specifies whether it is a range (e.g., low, medium, or high range) or a single number, and other attributes. In one embodiment, single spreadsheet cells can be connected to ranges of inputs (e.g., low-medium-high ranges), where only one input at a time will be passed into the controller 120.

The controller 120 can extend the functionality of spreadsheet models by creating a set of commands or instructions that relate the models to each other across the DAG, separate the data entry and outputs from the model, and conduct additional analyses, such as creating "tornado" diagrams (as described in more detail below). In one embodiment, the controller 120 creates a command that operates on elements declared in the Spreadsheet Structure Command. For example, a "TORNADODIST" command (which is an Enhancement Command, a special kind of Spreadsheet Action Command) can operate on outputs of the spreadsheet model that are declared in the Spreadsheet Structure Command. This command may specify parameters that drive a Tornado Chart Analysis and may determine or control the outputs of the spreadsheet model 125 that is used to generate the chart. In one embodiment, this command also specifies display and layout characteristics of the chart.

Figure 5:
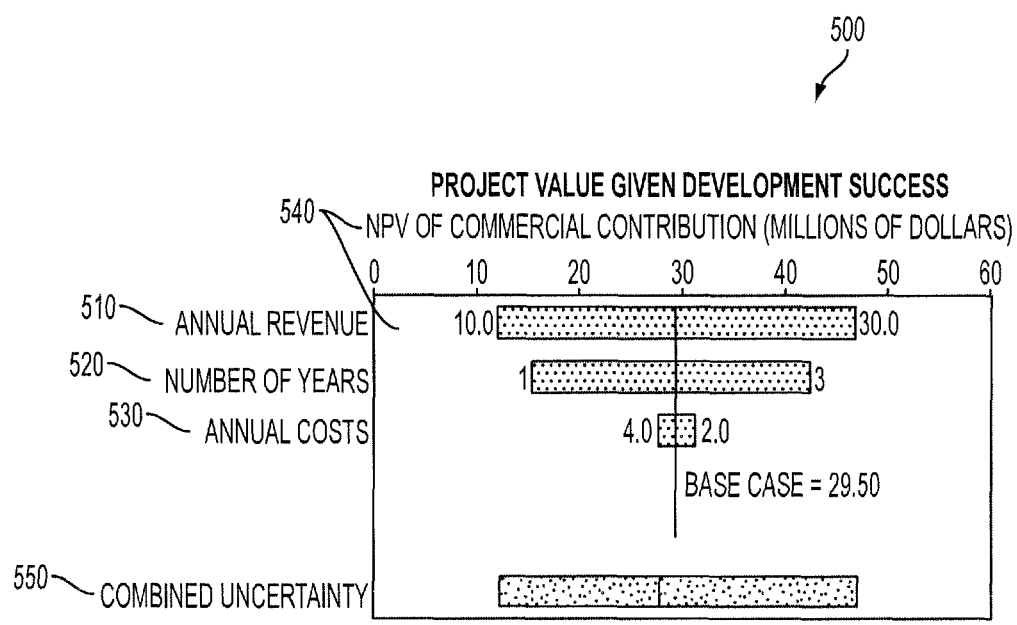
FIG. 5 is a graphical representation of a tornado chart in accordance with the present disclosure.

In one embodiment, a Tornado Chart analysis involves supplying ranges of numbers for each factor in an evaluation model, and noting how an output of interest changes. FIG. 5 shows an example of a Tornado chart 500 produced by the "TORNADODIST" command (an Enhancement Command under Spreadsheet Action Commands). This chart 500 shows three factors in the model, Annual Revenue 510, Number of Years 520, and Annual Costs 530, whose inputs are varied and supplied to the model. The output, in this case "NPV of Commercial Contribution" 540, is noted and plotted. The uncertainty bars are also summarized as a "Combined Uncertainty" bar 550 at the bottom of the chart 500.

Another example of a Spreadsheet Action command for the spreadsheet model instance is "INPUT_SCREEN" (which is a Presentation Command). This command enables the selection of inputs that will be placed on a single screen for accepting user entry. In one embodiment, this command provides the information necessary to create an input screen that permits tracking and auditing of input data, such as shown in FIG. 13. The Input_Screen command can also take advantage of the spreadsheet model database's flexibility and can be utilized to store auditing and/or pedigree information.

Other commands include "VERBATIM" which extracts a range in a spreadsheet as a table and displays this table on a single screen, and "VERBATIM_IMAGE" which extracts a range or a chart in a spreadsheet and displays this range or chart as an image. This is a Presentation Command (a kind of Spreadsheet Action Command).

In one embodiment, the controller 120 enables comparison of multiple evaluations using these models by extracting specific information from the evaluations. The controller 120 can filter and/or group the information (e.g., across the structure) and put the information on a common footing for comparison at various points in the data structure. This can be achieved by commands that work at a higher level than the spreadsheet model instance. These commands can work on the results of evaluations of multiple model instances.

For example, a command "Compare_Uncertainty" can enable comparison of the summary bars in a Tornado evaluation of underlying model instances in the hierarchy. As another example, "Compare_Value" enables comparison of scalar outputs for underlying model instances in the hierarchy. As another example, "CFO_Chart" displays a cumulative comparison of two quantities sorted by their ratio (e.g., value and cost). In one embodiment, this command maps underlying model instances on a chart. "Scatter_Plot" can map underlying model instances based on two specified outputs, one for each axis. "Innovation_Screen" can map underlying model instances like a scatterplot, but can also draw dividing lines at specified locations. These are Structure Action Commands.

The controller 120 can also enable aggregation of multiple evaluations using the spreadsheet models by transmitting outputs from evaluations into the model relationship structure, performing an aggregation operation (like addition or convolution), and feeding this data back into another model at a different point on the model relationship structure to perform additional calculations.

This can be done in several ways. For example, the controller 120 can tag different nodes in the hierarchy and then converge on a subset of nodes based on chosen tags for commands to execute, which enables comparisons to be performed. In another example, the controller 120 can converge on multiple tags, and child or sibling nodes can provide a pivoting function which may be simpler for the user to understand. The controller 120 can also combine data from child nodes, either directly or in an aggregated form, to combine results from models.

In one embodiment, the controller 120 uses a specification computer language, such as JSON or XML, to describe a spreadsheet, manipulate the spreadsheet, and/or to produce web applications. A template may be viewed as a combination of a spreadsheet file and JSON specification files. For example, a "salesForecast" Excel® template can have the following four parts:

1. Data Structure Specification: The inputs and scalar outputs in the Excel® model; these are the Spreadsheet Specification Commands (under Spreadsheet Commands).
2. Application Structure Specification: The menu structure of the web application, and commands that will be executed for each menu item for each "project"; these are the Presentation and Enhancement Commands (under Spreadsheet Action Commands); the application structure also contains Structure Specification Commands (under Structure Commands) which specify the outputs that are available to parents of instances of this Model Template.
3. Portfolio Structure Specification: The portfolio structure specifies how multiple "projects" will be collected and analyzed together; these are comprised of Structure Action Commands (under Structure Commands).
4. Excel® model: The Excel® spreadsheet which holds the actual calculations The three specification models lay out how the Excel® model can be accessed and used to produce web applications.

Figure 6:
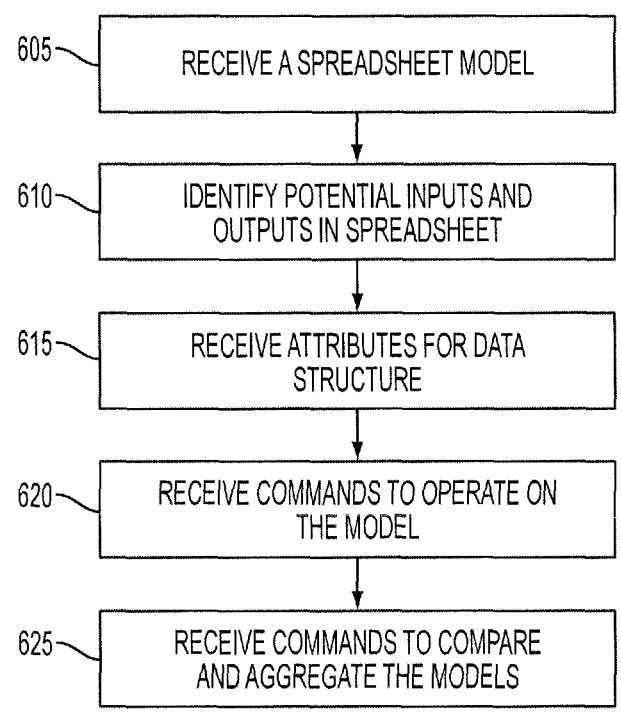
FIG. 6 is a flowchart illustrating steps performed by the controller in accordance with the present disclosure.

In one embodiment, the controller 120 interprets spreadsheet models and extracts their input, output, and/or logical elements to parse them for a web application. This enables conversion of a spreadsheet model. FIG. 6 shows an embodiment of steps performed by the controller 120 to parse models for a web application. The controller 120 receives one or more spreadsheet models (Step 605). The controller 120 can then identify potential inputs and/or outputs in a spreadsheet from the model (Step 610). An input can be a named range without a formula, and an output can be a named range with a formula. In one embodiment, the controller 120 receives attributes for a data structure from the user (Step 615). The controller 120 can then receive commands (e.g., from the user) to operate on the spreadsheet model (Step 620). These commands can be combined or nested using the inputs and/or outputs from Step 610. In one embodiment, the commands form a data structure called an "application structure". The controller 120 may then receive (e.g., from the user) commands that compare and/or aggregate the spreadsheet models (Step 625). These commands are combined or nested based on the inputs and outputs in the data and application structures. These commands form a data structure called a "portfolio structure".

The JSON data structure specification involves the use of Spreadsheet Specification Commands that identify what to send as inputs to the Excel model, and what to fetch back from the Excel model as outputs. In one embodiment, the format of the data structure JSON is:

```
{
  "ID":"identifier of template",
    "Description": "Description of template",
    "ExcelFile": "Excel file on which the data structure spec operates",
    "Inputs":[
      {
        "Key": "unique identifier of input",
        "Display": "readable prompt for input",
        "Type": "DISTRIBUTION|SCALAR",
        "CellLink": "Excel range where input should be sent",
        "Description": "description of input",
        "Constraint": "double|integer|text",
        "Units": "description of units",
        "Val": default values
      },{...}
    ],
    "Outputs":[
      {
        "Key":"unique identified of output",
        "Type":"SCALAR",
        "Display": "readable label for output",
        "Units": "description of units",
        "CellLink": "Excel range from which this should be fetched",
        "Val": default values
      }, {...}
    ]
}
```

As an example, consider the data structure specification below:

```
{
    "ID":"salesForecast",
    "Description": "Sales Forecast Template",
    "ExcelFile": "salesForecast_template.xls",
    "Inputs":[
        {
            "Key": "latinAmerica",
            "Display": "Latin America Net Sales",
            "Type": "DISTRIBUTION",
            "CellLink": "sales!latinAmerica",
            "Description": "Net trade sales in 2017 (millions of dollars)",
            "Constraint": "double",
            "Units": "millions of USD",
            "Val":[35,60,90]
        },
        {
            "Key": "latinAmericaMargin",
            "Display": "Latin America Margin",
            "Type": "DISTRIBUTION",
            "CellLink": "sales!laMargin",
            "Description": "Gross Margin as a fraction of net sales (%)",
            "Constraint": "double",
            "Units": "fraction",
            "Val":[0.2,0.22,0.25]
        },
        {
            "Key": "ausNz",
            "Display": "Aus and NZ Net Sales",
            "Type": "DISTRIBUTION",
            "CellLink": "sales!ausNz",
            "Description": "Net trade sales in 2017 (millions of dollars)",
            "Constraint": "double",
            "Units": "millions of USD",
            "Val":[25,30,40]
        },
        {
            "Key": "ausNzMargin",
            "Display": "Aus and NZ Margin",
            "Type": "DISTRIBUTION",
            "CellLink": "sales!ausNzMargin",
            "Description": "Gross Margin as a fraction of net sales (%)",
            "Constraint": "double",
            "Units": "fraction",
            "Val":[0.3,0.32,0.35]
        },
        {
            "Key": "asia",
            "Display": "Asia Net Sales",
            "Type": "DISTRIBUTION",
            "CellLink": "sales!asia",
            "Description": "Net trade sales in 2017 (millions of dollars)",
            "Constraint": "double",
            "Units": "millions of USD",
            "Val":[30,40,65]
        },
        {
            "Key": "asiaMargin",
            "Display": "Asia Margin",
            "Type": "DISTRIBUTION",
            "CellLink": "sales!asiaMargin",
            "Description": "Gross Margin as a fraction of net sales (%)",
            "Constraint": "double",
            "Units": "fraction",
            "Val":[0.25,0.27,0.3]
        },
        {
            "Key": "emea",
            "Display": "EMEA Net Sales",
            "Type": "DISTRIBUTION",
            "CellLink": "sales!emea",
            "Description": "Net trade sales in 2017 (millions of dollars)",
            "Constraint": "double",
            "Units": "millions of USD",
            "Val":[50,100,130]
        },
        {
            "Key": "emeaMargin",
            "Display": "Emea margin",
            "Type": "DISTRIBUTION",
            "CellLink": "sales!emeaMargin",
            "Description": "Gross Margin as a fraction of net sales (%)",
            "Constraint": "double",
            "Units": "fraction",
            "Val":[0.18,0.2,0.22]
        },
        {
            "Key": "na",
            "Display": "North America Net Sales",
            "Type": "DISTRIBUTION",
            "CellLink": "sales!northAmerica",
            "Description": "Net trade sales in 2017 (millions of dollars)",
            "Constraint": "double",
            "Units": "millions of USD",
            "Val":[200,270,320]
        },
        {
            "Key": "northAmericaMargin",
            "Display": "North America Margin",
            "Type": "DISTRIBUTION",
            "CellLink": "sales!naMargin",
            "Description": "Gross Margin as a fraction of net sales (%)",
            "Constraint": "double",
            "Units": "fraction",
            "Val":[0.2,0.22,0.25]
        },
    ],
    "Outputs":[
        {
            "Key":"totalNetSales",
            "Type":"SCALAR",
            "Display": "Total Net Sales",
            "Units": "millions of USD",
            "CellLink": "sales!totalNetSales",
            "Val": 0.0
        },
        {
            "Key":"totalOperatingProfit",
            "Type":"SCALAR",
            "Display": "Total Operating Profit",
            "Units": "millions of USD",
            "CellLink": "sales!totalOperatingProfit",
            "Val": 0.0
        },
    ]
}
```

The application structure specification can use commands that set up a web interface for inputs and outputs, as well as specialized analysis, as shown in the example below.

```
{
    "ID":"salesForecast",
    "MENU": [
```

-continued

```
{
    "ID": "modelInputs",
        "Display": "Model Inputs",
        "Command": "INPUT_SCREEN",
        "Parameters": { "InputKeys": ["latinAmerica", "latinAmericaMargin", "ausNz", "ausNzMargin", "asia", "asiaMargin", "emea", "emeaMargin", "na", "northAmericaMargin"]}
    },
    {
        "ID": "baseCase",
        "Display": "Base Case",
        "Command": "VERBATIM",
        "Parameters": {"CellLink": "sales!baseCase", "OutputKey": "baseCase"}
    },
    {
        "ID": "totalNetSales",
        "Display": "Total Net Sales",
        "Command": "VERBATIM",
        "Parameters": {"CellLink": "sales!totalNetSales", "OutputKey": "netSales"}
    },
    {
        "ID": "totalOperatingProfit",
        "Display": "Total Operating Profit",
        "Command": "VERBATIM",
        "Parameters": {"CellLink": "sales!totalOperatingProfit", "OutputKey": "operatingProfit"}
    },
    {
        "ID": "tornado",
        "Display": "Tornado",
        "Command": "TORNADODIST",
        "Parameters": {"ValueMetricKeys":["totalNetSales", "totalOperatingProfit"],
            "Depth": 4,
            "Weights": {"Low":0.25,"Med":0.5,"High":0.25},
            "ChartTitle": "Commercial Contribution in 5 years",
                "CombinedUncertaintyLabel": "Combined Uncertainty Range"
            }
        }
    ],
    "PostProcessingOutputsForPortfolio": [
            {"Key": "netSales", "Title": "Mean of Total Net Sales", "Reference": "TornadoDistOutputs[0].Mean"},
            {"Key": "netProfit", "Title": "Mean of Annual Profit", "Reference": "TornadoDistOutputs[1].Mean"}
        ]
}
```

The application structure may specify what a "project" can do as well as outputs of a project that can be promoted for portfolio comparisons (PostProcessingOutputsforPortfolio).

The portfolio structure specification can specify how projects that use a particular application and data structure combine and what operations are available on them. For example:

```
{
    "MENU": [
        {
            "ID": "compareUncertainty",
            "Display": "Compare Uncertainty",
            "Command": "COMPARE_UNCERTAINTY",
            "Context": {
                "RequiredCommandInNodeTemplate": "TORNADO_DIST"
            },
            "Parameters": {
                "NodeLookup": "TornadoDistOutputs",
                "Keys":["Key", "Summary", "Mean", "Display", "Units"]
            }
        },
        {
            "ID": "compareValue",
            "Display": "Compare Value",
            "Command": "COMPARE_VALUE",
            "Parameters": {
                "NodeLookup": "Outputs",
                "Keys":["netSales", "netProfit"],
```

-continued

```
                "Titles": ["Net Sales", "Net Operating Profit"],
                "Units": ["Millions of dollars", "Millions of dollars"],
                    "Total": false
                }
            }
        ]
}
```

In the example above, this specification can be used to design screens that allow value and uncertainty comparisons, using outputs that are defined in the application structure and the data structure.

Reentrancy can also be set into outputs and post-processing outputs as well as commands. This allows the model template to be entered twice, first to get needed outputs, and then again to get higher level outputs using the first outputs as inputs.

In one embodiment, the user through a computing device interacts with the GUI and strings together or concatenates related models with a hierarchy (tree). As stated above, this can be referred to as the model relationship structure. This hierarchical structure can enable related models to interconnect and share information. In one embodiment, the nature of the hierarchy allows models to define themselves in a plug-and-play manner, enabling quick configuration of complex analysis systems.

The hierarchy allows models to be applied to every node. The hierarchy can enable moving and modifying nodes, such as through tagging and node selection. Flexible tagging allows specification of any label on any node. Node selection may be of two kinds: i) Selection of children of current nodes in the hierarchy, and ii) Selection of siblings of current nodes in the hierarchy. In one embodiment, the models specify the actual meaning of the intersections of tagging and children of current and siblings of current nodes through filtering operations and comparisons.

The relationship of the hierarchy with related models can be specified with a specially constructed command language. The language may be implemented in the JSON standard because JSON is parseable. The command language maintains a structure that allows consistent specification of inputs and outputs. Moreover, each command follows a standard that allows the command to pass information around in a consistent manner.

The model relationship structure consists of hierarchical relationships of related models, and can be stored in a document database to allow for flexibility and uncertainty of precise model details. The document database may support JSON objects, and the data produced can be stored in this format.

For example, suppose a spreadsheet has the cells shown in FIG. 14. Inputs are specified by declaring each input, describing the input and connecting the input to a spreadsheet cell where the input needs to be sent, once obtained from the user. In this example, the inputs would be the numbers under Net Sales and Margin.

In one embodiment, outputs are declared similarly, and can be fetched from the spreadsheet once the inputs have been supplied and the calculations have been completed. In this example, the Totals of Net Sales and Operating Profit are one kind of output. Another output is the entire table above. An example of special processing involves adding uncertainty to the inputs and testing how the outputs change. This results in a Tornado chart, which is a summarized uncertainty bar and a mean value. In one embodiment, the summarized uncertainty bar and mean value are declared as available to parent nodes (e.g., for rollups).

FIG. 7A is a block diagram of an embodiment of a system diagram 700. A user enters input 705 (e.g., values) into one or more spreadsheet models 710 (e.g., created by the user). The spreadsheet models 710 are converted into a template 715. The template 715 is based on a specification 718 which includes inputs, outputs, and instructions. The template 715 is stored in a document database 720. The document database 720 is in communication with one or more extensible action libraries 725. The library 725 can include commands such as TORNADODIST, VERBATIM, and/or INPUT_SCREEN as described above. The database 720 communicates with a controller 730 (e.g., controller 120) which deploys one or more template instances, such as template instance 1 740, template instance 2 750, etc.

Using the same example above (and reproduced below), assume a spreadsheet as shown in FIG. 14.

In one embodiment, the controller 120 specifies inputs and outputs by identifying cells in the spreadsheet. In particular, the controller 120 navigates the above spreadsheet cell by cell and provides i) a unique name to each input and each output, ii) a description for each cell (e.g., human readable), iii) the cell it maps onto, iv) units (e.g., human readable), v) the constraints on this cell's potential inputs, and vi) default values.

In one embodiment, the controller 120 specifies operations that can be performed on a spreadsheet model 125, such as producing a tornado chart. The combination of the data structure and the project structure can result in a "project view" where this model can be applied for multiple projects. This project view can be deployed easily over multiple mediums (e.g. the web). This can also expose higher level outputs (e.g., from the tornado operation) that can be used by the portfolio structure.

A portfolio structure (containing Structure Action Commands) may define operations on outputs exposed either by the data structure or the project structure and may specify screens that the user can use to execute these operations. In one embodiment, the user can compose trees of projects and can cut, copy, paste, and/or modify the data using the portfolio, project, and/or data structures.

A platform structure can be generated as a specialized application structure that enables interaction with spreadsheets at a portfolio node, using both Structure and Spreadsheet Action Commands. This structure uses outputs from a project node, performs analytical operations on the output, sends the output back to the spreadsheet, and obtains additional results (e.g., convolution). Thus, users can declare interfaces off of spreadsheets.

An example of the data structure (Spreadsheet Specification Command) is:

```
{
  "ID": "salesForecast",
  "Description": "Sales Forecast Template",
  "ExcelFile": "salesForecast_template.xls",
  "Inputs": [
    {
      "Key": "latinAmerica",
      "Display": "Latin America Net Sales",
      "Type": "DISTRIBUTION",
      "CellLink": "sales!latinAmerica",
      "Description": "Net trade sales in 2017 (millions of dollars)",
      "Constraint": "double",
      "Units": "millions of USD",
      "Val": [
        35,
        60,
        90
      ]
    },
    {
      "Key": "latinAmericaMargin",
      "Display": "Latin America Margin",
      "Type": "DISTRIBUTION",
      "CellLink": "sales!laMargin",
      "Description": "Gross Margin as a fraction of net sales (%)",
      "Constraint": "double",
      "Units": "fraction",
      "Val": [
        0.2,
        0.22,
        0.25
      ]
    },
    {
      "Key": "ausNz",
      "Display": "Aus and NZ Net Sales",
      "Type": "DISTRIBUTION",
      "CellLink": "sales!ausNz",
      "Description": "Net trade sales in 2017 (millions of dollars)",
      "Constraint": "double",
      "Units": "millions of USD",
      "Val": [
        25,
        30,
        40
      ]
    },
    {
      "Key": "ausNzMargin",
      "Display": "Aus and NZ Margin",
```

```
"Type": "DISTRIBUTION",
"CellLink": "sales!ausNzMargin",
"Description": "Gross Margin as a fraction of net sales (%)",
"Constraint": "double",
"Units": "fraction",
"Val": [
    0.3,
    0.32,
    0.35
]
},
{
"Key": "asia",
"Display": "Asia Net Sales",
"Type": "DISTRIBUTION",
"CellLink": "sales!asia",
"Description": "Net trade sales in 2017 (millions of dollars)",
"Constraint": "double",
"Units": "millions of USD",
"Val": [
    30,
    40,
    65
]
},
{
"Key": "asiaMargin",
"Display": "Asia Margin",
"Type": "DISTRIBUTION",
"CellLink": "sales!asiaMargin",
"Description": "Gross Margin as a fraction of net sales (%)",
"Constraint": "double",
"Units": "fraction",
"Val": [
    0.25,
    0.27,
    0.3
]
},
{
"Key": "emea",
"Display": "EMEA Net Sales",
"Type": "DISTRIBUTION",
"CellLink": "sales!emea",
"Description": "Net trade sales in 2017 (millions of dollars)",
"Constraint": "double",
"Units": "millions of USD",
"Val": [
    50,
    100,
    130
]
},
{
"Key": "emeaMargin",
"Display": "Emea margin",
"Type": "DISTRIBUTION",
"CellLink": "sales!emeaMargin",
"Description": "Gross Margin as a fraction of net sales (%)",
"Constraint": "double",
"Units": "fraction",
"Val": [
    0.18,
    0.2,
    0.22
]
},
{
"Key": "na",
"Display": "North America Net Sales",
"Type": "DISTRIBUTION",
"CellLink": "sales!northAmerica",
"Description": "Net trade sales in 2017 (millions of dollars)",
"Constraint": "double",
"Units": "millions of USD",
"Val": [
    200,
    270,
    320
]
},
{
"Key": "northAmericaMargin",
"Display": "North America Margin",
"Type": "DISTRIBUTION",
"CellLink": "sales!naMargin",
"Description": "Gross Margin as a fraction of net sales (%)",
"Constraint": "double",
"Units": "fraction",
"Val": [
    0.2,
    0.22,
    0.25
]
}
],
"Outputs": [
    {
    "Key": "totalNetSales",
    "Type": "SCALAR",
    "Display": "Total Net Sales",
    "Units": "millions of USD",
    "CellLink": "sales!totalNetSales",
    "Val": 0
    },
    {
    "Key": "totalOperatingProfit",
    "Type": "SCALAR",
    "Display": "Total Operating Profit",
    "Units": "millions of USD",
    "CellLink": "sales!totalOperatingProfit",
    "Val": 0
    }
]
}
```

An example of an app structure is:

```
{
"ID": "salesForecast",
"MENU": [
    {
    "ID": "modelInputs",
    "Display": "Model Inputs",
    "Command": "INPUT_SCREEN",
    "Parameters": {
        "InputKeys": [
            "latinAmerica",
            "latinAmericaMargin",
            "ausNz",
            "ausNzMargin",
            "asia",
            "asiaMargin",
            "emea",
            "emeaMargin",
            "na",
            "northAmericaMargin"
        ]
    }
    },
    {
    "ID": "baseCase",
    "Display": "Base Case",
    "Command": "VERBATIM",
    "Parameters": {
        "CellLink": "sales!baseCase",
        "OutputKey": "baseCase"
    }
    },
    {
    "ID": "totalNetSales",
    "Display": "Total Net Sales",
    "Command": "VERBATIM",
    "Parameters": {
        "CellLink": "sales!totalNetSales",
        "OutputKey": "netSales"
```

```
        }
    },
    {
        "ID": "totalOperatingProfit",
        "Display": "Total Operating Profit",
        "Command": "VERBATIM",
        "Parameters": {
            "CellLink": "sales!totalOperatingProfit",
            "OutputKey": "operatingProfit"
        }
    },
    {
        "ID": "tornado",
        "Display": "Tornado",
        "Command": "TORNADODIST",
        "Parameters": {
            "ValueMetricKeys": [
                "totalNetSales",
                "totalOperatingProfit"
            ],
            "Depth": 4,
            "Weights": {
                "Low": 0.25,
                "Med": 0.5,
                "High": 0.25
            },
            "ChartTitle": "Commercial Contribution in 5 years",
            "CombinedUncertaintyLabel": "Combined Uncertainty Range"
        }
    }
],
"PostProcessingOutputsForPortfolio": [
    {
        "Key": "netSales",
        "Title": "Mean of Total Net Sales",
        "Reference": "TornadoDistOutputs[0].Mean"
    },
    {
        "Key": "netProfit",
        "Title": "Mean of Annual Profit",
        "Reference": "TornadoDistOutputs [1].Mean"
    }
]
}
```

An example of a portfolio structure comprising of Structure Action Commands is:

```
"MENU": [
    {
        "ID": "compareUncertainty",
        "Display": "Compare Uncertainty",
        "Command": "COMPARE_UNCERTAINTY",
        "Context": {
            "RequiredCommandInNodeTemplate": "TORNADO_DIST"
        },
        "Parameters": {
            "NodeLookup": "TornadoDistOutputs",
            "Keys": [
                "Key",
                "Summary",
                "Mean",
                "Display",
                "Units"
            ]
        }
    },
    {
        "ID": "compareValue",
        "Display": "Compare Value",
        "Command": "COMPARE_VALUE",
        "Parameters": {
            "NodeLookup": "Outputs",
            "Keys": [
                "netSales",
                "netProfit"
            ],
```
```
            "Titles": [
                "Net Sales",
                "Net Operating Profit"
            ],
            "Units": [
                "Millions of dollars",
                "Millions of dollars"
            ],
            "Total": false
        }
    }
]
}
```

The result can be a massive saving of programming time and the possibility of deploying powerful spreadsheet models. Whole portfolio management systems can also be obtained quickly via Excel and the JSON specifications.

FIG. 7B is an embodiment of a screen shot 760 having a model relationship structure 765, commands 770, and actions 775. The data structure 765 is created by the user and in this example includes an instance 780 of model "Breath Strips". The user inputs commands 770 to the server 115, such as an action to generate a tornado chart (as described above). In response to receiving the commands 770, the controller 120 performs the selection action 775, as shown by the graphs in the screen shot 760.

Figure 8:
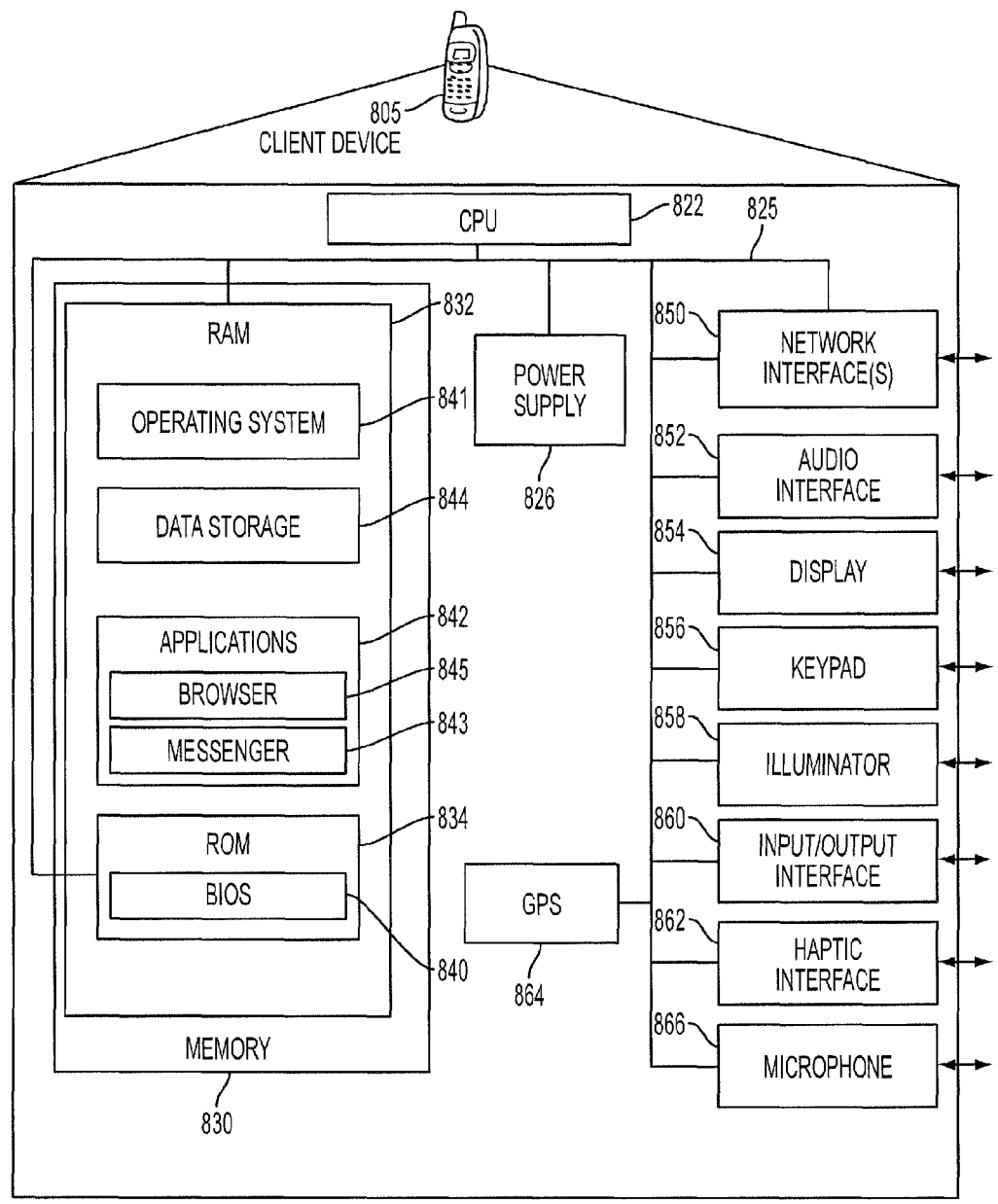
FIG. 8 is a block diagram of components of a client device in accordance with the present disclosure.

FIG. 8 shows a schematic diagram illustrating a client device 805 which may include any suitable computing device capable of sending or receiving signals, such as via a wired or wireless network. A client device 805 may, for example, include a desktop computer or a portable device, such as a cellular telephone, a smartphone, a display pager, a radio frequency (RF) device, an infrared (IR) device, a Personal Digital Assistant (PDA), a handheld computer, a tablet computer, a laptop computer, a digital camera, a set top box, a wearable computer, an integrated device combining various features, such as features of the foregoing devices, or the like.

The client device 805 may vary in terms of capabilities or features. Claimed subject matter is intended to cover a wide range of potential variations. For example, a cell phone may include a numeric keypad or a display of limited functionality, such as a monochrome liquid crystal display (LCD) for displaying text, pictures, etc. In contrast, however, as another example, a web-enabled client device may include one or more physical or virtual keyboards, mass storage, one or more accelerometers, one or more gyroscopes, global positioning system (GPS) or other location-identifying type capability, of a display with a high degree of functionality, such as a touch-sensitive color 2D or 3D display, for example.

A client device 805 may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, to provide only a few possible examples. Additionally, a client device may also include or execute an application to communicate content, such as, for example, textual content, multimedia content, or the like. Moreover, a client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

As shown in the example of FIG. 8, client device 805 may include one or more processing units (also referred to herein as CPUs) 822, which interface with at least one computer bus 825. A memory 830 can be persistent storage and interfaces with the computer bus 825. The memory 830 includes RAM 832 and ROM 834. ROM 834 includes a BIOS 840. Memory 830 interfaces with computer bus 825 so as to provide information stored in memory 830 to CPU 822 during execution of software programs such as an operating system 841, application programs 842, device drivers, and software modules 843, 845 that comprise program code, and/or computer-executable process steps, incorporating functionality described herein, e.g., one or more of process flows described herein. CPU 822 first loads computer-executable process steps from storage, e.g., memory 832, data storage medium/media 844, removable media drive, and/or other storage device. CPU 822 can then execute the stored process steps in order to execute the loaded computer-executable process steps. Stored data, e.g., data stored by a storage device, can be accessed by CPU 822 during the execution of computer-executable process steps.

Persistent storage medium/media 844 is a computer readable storage medium(s) that can be used to store software and data, e.g., an operating system and one or more application programs. Persistent storage medium/media 844 can also be used to store device drivers, such as one or more of a digital camera driver, monitor driver, printer driver, scanner driver, or other device drivers, web pages, content files, playlists and other files. Persistent storage medium/media 844 can further include program modules and data files used to implement one or more aspects of the present disclosure.

As will be appreciated by those skilled in the art, a computer readable medium is configurable such that it stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media thus can refer to physical or tangible storage (as opposed to signals) and includes without limitation volatile and non-volatile, removable and non-removable media implemented in any method or technology for the tangible storage of information such as computer-readable instructions, data structures, program modules or other data. Additionally, computer readable storage media can include, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Client device 805 can also include one or more of a power supply 826, network interface 850, audio interface 852, a display 854 (e.g., a monitor or screen), keypad 856, illuminator 858, I/O interface 860, a haptic interface 862, a GPS 864, and/or a microphone 866.

A module can be a software, hardware, or firmware (or combinations thereof) system, process or functionality, or component thereof, that performs or facilitates the processes, features, and/or functions described herein (with or without human interaction or augmentation). A module can also include sub-modules. Software components of a module may be stored on a computer readable medium. Modules may be integral to one or more servers, or be loaded and executed by one or more servers. One or more modules may be grouped into an engine or an application.

Figure 9:
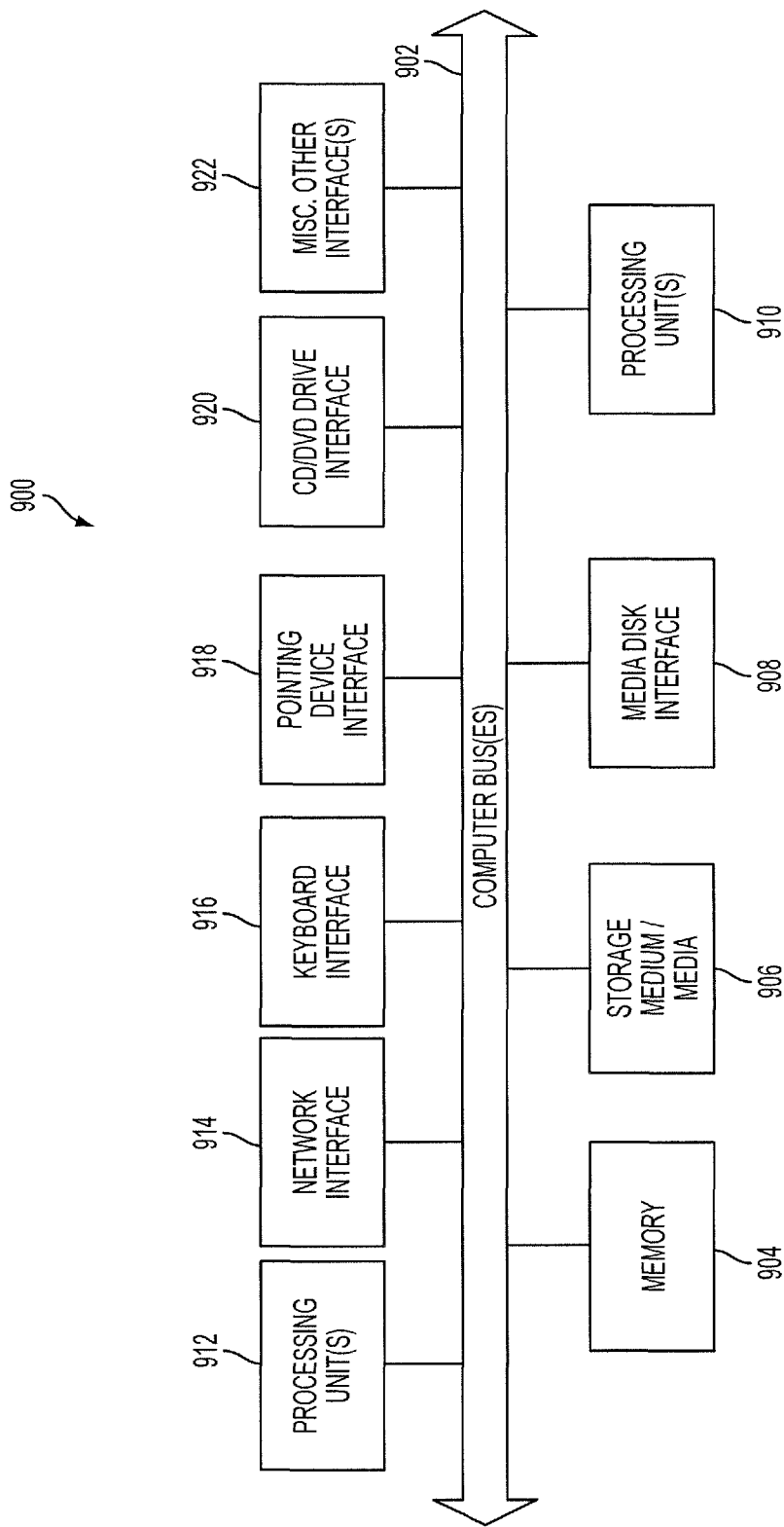
FIG. 9 is a block diagram illustrating an internal architecture of a computer in accordance with the present disclosure.

FIG. 9 is a block diagram illustrating an internal architecture of an example of a computer, such as server computer 115 and/or client device 105 in accordance with one or more aspects of the present disclosure. A computer can be any device with a processor capable of executing logic or coded instructions, and could, for example, be a server, personal computer, set top box, tablet, smart phone, pad computer or media device, to name a few such devices. As shown in FIG. 9, internal architecture 900 can be configured to include one or more processing units (also referred to herein as CPUs) 912, which interface with at least one computer bus 902. Also interfacing with computer bus 902 are persistent storage medium/media 906, network interface 914, memory 904, e.g., random access memory (RAM), run-time transient memory, read only memory (ROM), etc., media disk drive interface 908 as an interface for a drive that can read and/or write to media including removable media such as floppy, CD-ROM, DVD, etc. media, display interface 910 as interface for a monitor or other display device, keyboard interface 916 as interface for a keyboard, pointing device interface 918 as an interface for a mouse or other pointing device, and miscellaneous other interfaces not shown individually, such as parallel and serial port interfaces, a universal serial bus (USB) interface, and the like.

Memory 904 is configurable to interface with computer bus 902 to provide information stored in memory 904 to CPU 912 during execution of software programs such as an operating system, application programs, device drivers, and software modules that comprise program code, and/or computer-executable process steps, incorporating functionality described herein, e.g., one or more of process flows described herein. CPU 912 first loads computer-executable process steps from storage, e.g., memory 904, storage medium/media 906, removable media drive, and/or other storage device. CPU 912 can then execute the stored process steps in order to execute the loaded computer-executable process steps. Stored data, e.g., data stored by a storage device, can be accessed by CPU 912 during the execution of computer-executable process steps.

As described above, persistent storage medium/media 906 is a computer readable storage medium(s) that can be used to store software and data, e.g., an operating system and one or more application programs. Persistent storage medium/media 906 can also be used to store device drivers, such as one or more of a digital camera driver, monitor driver, printer driver, scanner driver, or other device drivers, web pages, content files, playlists and other files. Persistent storage medium/media 906 can further include program modules and data files used to implement one or more aspects of the present disclosure.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the user computing device or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method comprising: receiving, by a computing device, a spreadsheet model; receiving, by the computing device, a model template wherein the model template further comprises instructions for spreadsheet evaluation, template management, and web representation; and template management instructions on how to manage evaluations; and deploying, by the computing device, an instance of the model template into a model relationship structure relating one or more model template instances wherein the deploying of an instance of the model template occurs in a model relationship structure selected from a tree, a directed acyclic graph (DAG), and a matrix; wherein the template management instructions includes instructions on how evaluations using the model template interrelate with evaluations from the one or more other model template instances.

2. The method of claim 1, wherein the receiving template management instructions on how to manage evaluations comprises receiving template management instructions includes instructions on how to create, coordinate, synchronize, compare, or aggregate evaluations.

3. The method of claim 1, wherein the deploying of an instance of the model template further comprises publishing the instance on a web page.

4. The method of claim 1, further comprising determining, by the computing device, inputs and outputs of the model template.

5. The method of claim 1, wherein the deploying of the model template further comprises creating template management instructions that relate the model template instances to each other across one of the tree, DAG, and matrix.

6. The method of claim 1, further comprising separating, by the computing device, inputs and outputs of the model template.

7. The method of claim 1, wherein the receiving of the model template further comprises one or more of comparing evaluations, aggregating evaluations, synchronizing evaluations, enhancing the model template, and determining relationships along the model template relationship structure.

8. The method of claim 1, wherein the deploying of an instance of the model template occurs in response to user action.

9. A computing device comprising: a processor; a storage medium for tangibly storing thereon program logic for execution by the processor, the program logic comprising: spreadsheet model receiving logic executed by the processor for receiving a spreadsheet model; template management instruction receiving logic executed by the processor for receiving a model template wherein the model template further comprises instructions for spreadsheet evaluation, template management, and web representation; and deploying logic executed by the processor for deploying an instance of the model template into a model relationship structure relating one or more spreadsheet model instances wherein the deploying of an instance of the model template occurs in a model relationship structure selected from a tree, a directed acyclic graph (DAG), and a matrix; wherein the template management instruction receiving logic receives template management instructions on how evaluations using the model template interrelate with evaluations from the one or more spreadsheet other model template instances.

10. The computing device of claim 9, wherein the template management instruction receiving logic receives template management instructions on how to create, coordinate, synchronize, compare, or aggregate evaluations.

11. The computing device of claim 9, wherein the deploying logic publishes the instance on a web page.

12. The computing device of claim 9, further comprising determining logic executed by the processor for determining inputs and outputs of the model template.

13. The computing device of claim 9, wherein the deploying logic utilizes a tree, a directed acyclic graph (DAG), or a matrix to represent a relationship between model instances.

14. The computing device of claim 9, wherein the template management instruction receiving logic creates template management instructions that relate the one or more model template instances to each other across one of the tree, the DAG, and the matrix.

15. The computing device of claim 9, further comprising separating logic executed by the processor for separating inputs and outputs of the model template.

16. The computing device of claim 9, wherein the template management instruction receiving logic further comprises logic executed by the processor for one or more of comparing evaluations, aggregating evaluations, synchronizing evaluations, enhancing the model template, and determining relationships along the model template relationship structure.

17. The computing device of claim 9, wherein the deploying logic executed by the processor for deploying an instance of the model template occurs in response to user action.

18. A non-transitory computer readable storage medium tangibly storing computer program instructions capable of being executed by a computer processor, the computer program instructions defining the steps of: receiving, by the computer processor, a spreadsheet model; receiving, by the computer processor, a model template wherein the model template further comprises instructions for spreadsheet evaluation, template management and web representation; and template management instructions on how to manage evaluations; and deploying, by the computer processor, an instance of the model template into a model relationship structure relating one or more model template instances; wherein the deploying of an instance of the model template occurs in a model relationship structure selected from a tree, a directed acyclic graph (DAG), and a matrix; wherein the computer program instructions defining the step of receiving template management instructions on how to manage evaluations comprises computer program instructions defining the step of receiving template management instructions on how evaluations using the template interrelate with evaluations from the one or more other model template instances.

19. The non-transitory computer readable storage medium of claim 18, wherein the computer program instructions defining the step of receiving template management instructions on how to manage evaluations comprises computer program instructions defining the step of receiving template management instructions on how to create, coordinate, synchronize, compare, or aggregate evaluations.

20. The non-transitory computer readable storage medium of claim 18, wherein the computer program instructions defining the step of deploying an instance of the model template further comprises computer program instructions defining the step of publishing the instance on a web page.

21. The non-transitory computer readable storage medium of claim 18, further comprising computer program instructions defining the step of determining, by the computer processor, inputs and outputs of the model template.

22. The non-transitory computer readable storage medium of claim 18, wherein the computer program instructions defining the step of receiving the model template further comprises computer program instructions defining the step of creating template management instructions that relate the one or more spreadsheet models to each other across one of the tree, the DAG, and the matrix.

23. The non-transitory computer readable storage medium of claim 18, further comprising computer program instructions defining the step of separating, by the computer processor, inputs and the outputs of the model template.

24. The non-transitory computer readable storage medium of claim 18, wherein the computer program instructions defining the step of receiving the model template further comprises computer program instructions defining the steps of one or more of comparing evaluations, aggregating evaluations, synchronizing evaluations, enhancing the model template, and determining relationships along the model template relationship structure.

25. The non-transitory computer readable storage medium of claim 18, wherein the computer program instructions defining the step of deploying an instance of the model template occurs in response to user action.

* * * * *